(12) United States Patent
Snyder et al.

(10) Patent No.: US 12,076,941 B2
(45) Date of Patent: Sep. 3, 2024

(54) GLUE PEN

(71) Applicant: TECHTRONIC CORDLESS GP, Anderson, SC (US)

(72) Inventors: Todd Snyder, Greenville, SC (US); Grant A. Wood, Greenville, SC (US); Gabriel J. Sandoval, Piedmont, SC (US); Neil Wright, Greenville, SC (US); Ho Quynh Chau Duong, Greenville, SC (US); Brianna E. Williams, Mauldin, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/066,618

(22) Filed: Dec. 15, 2022

(65) Prior Publication Data
US 2023/0202122 A1   Jun. 29, 2023

Related U.S. Application Data

(60) Provisional application No. 63/294,602, filed on Dec. 29, 2021.

(51) Int. Cl.
*B29C 65/00* (2006.01)

(52) U.S. Cl.
CPC ............... *B29C 66/8616* (2013.01)

(58) Field of Classification Search
None
See application file for complete search history.

(56) References Cited

U.S. PATENT DOCUMENTS

| | | | |
|---|---|---|---|
| 3,612,357 A * | 10/1971 | Ruskin | B05C 17/0053 337/392 |
| 6,558,059 B1 * | 5/2003 | Hillinger | B05C 17/00536 401/2 |
| 6,820,768 B2 | 11/2004 | Belanger | |
| D724,400 S | 3/2015 | Filian et al. | |
| D740,630 S | 10/2015 | Hasenmayer | |
| D741,127 S | 10/2015 | Hasenmayer | |
| D741,128 S | 10/2015 | Hasenmayer | |
| D817,394 S | 5/2018 | Seferi | |
| D832,902 S | 11/2018 | Tsai | |
| D848,803 S | 5/2019 | Tsai | |
| D852,596 S | 7/2019 | Mantes et al. | |
| D909,161 S | 2/2021 | Tsai | |
| 2017/0282208 A1 | 10/2017 | Seferi | |
| 2018/0111213 A1 | 4/2018 | Mantes et al. | |

\* cited by examiner

*Primary Examiner* — Jacob T Minskey
*Assistant Examiner* — Adrianna N Konves
(74) *Attorney, Agent, or Firm* — Michael Best & Friedrich LLP

(57) ABSTRACT

A glue pen including a housing, a heater element, and a feed mechanism. The housing is configured to support a meltable adhesive substance. The heater element is disposed in the housing. The feed mechanism is coupled to the housing. The feed mechanism includes a first actuator and a second actuator. Each of the first actuator and the second actuator is selectively movable relative to the other actuator to move the meltable adhesive substance toward the heater element.

20 Claims, 25 Drawing Sheets

GLUE PEN

CROSS-REFERENCE TO RELATED APPLICATIONS

This application claims priority to U.S. Provisional Patent Application No. 63/294,602 filed on Dec. 29, 2021, the entire contents of which are incorporated by reference herein.

BACKGROUND

The disclosure relates to a glue pen, and more particularly to a heated glue pen including a feed mechanism.

SUMMARY

In one aspect, the disclosure provides a glue pen including a housing, a heater element, and a feed mechanism. The housing is configured to support a meltable adhesive substance. The heater element is disposed in the housing. The feed mechanism is coupled to the housing. The feed mechanism includes a first actuator and a second actuator. Each of the first actuator and the second actuator is selectively movable relative to the other actuator to move the meltable adhesive substance toward the heater element.

In another aspect, the disclosure provides a glue pen including a housing, a heater element, and a feed mechanism. The housing includes an output end and is configured to support a meltable adhesive substance. The heater element is disposed in the housing adjacent or at the output end. The feed mechanism is coupled to the housing. The feed mechanism includes an actuator movable pivotable about a first axis to engage the meltable adhesive substance. The actuator further movable from a start state to an end state to move the meltable adhesive substance toward the heater element.

In another aspect, the disclosure provides a glue pen including a housing, a heater element, and a feed mechanism. The housing is configured to support a meltable adhesive substance. The housing defines a passage and a feed axis extending longitudinally through the passage. The heater element is disposed in the housing. The feed mechanism is coupled to the housing. The feed mechanism includes an actuator protruding from a first side of the housing. The actuator is engageable to move the meltable adhesive substance along the feed axis toward the heater element.

Features and aspects of the disclosed technology will become apparent by consideration of the following detailed description and accompanying drawings.

DETAILED DESCRIPTION

Figure 1:
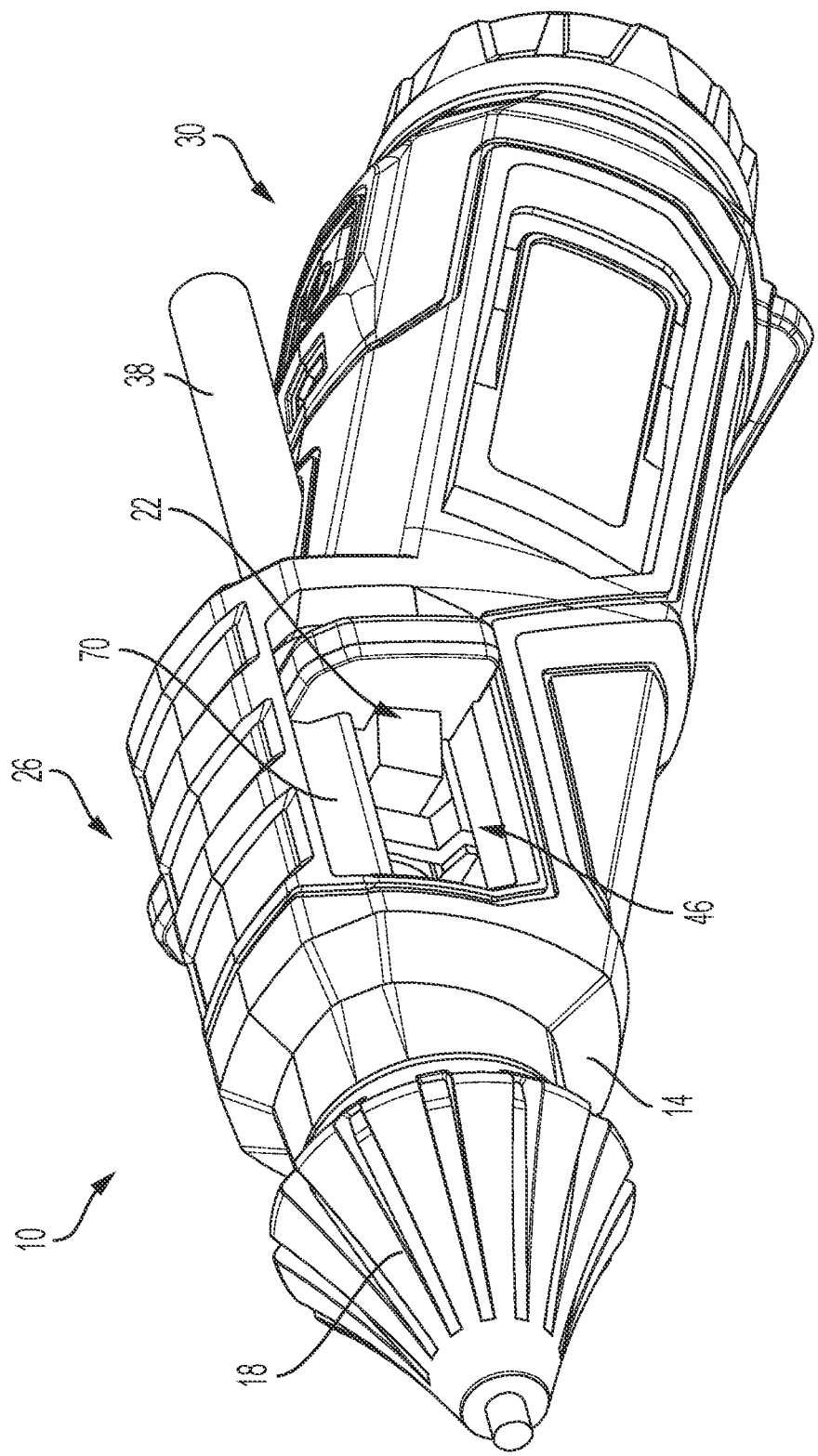
FIG. 1 is a perspective view of a glue pen including a housing, a heater element, and a feed mechanism in accordance with an exemplary embodiment of the present disclosure.

Before any embodiments of the disclosed technology are explained in detail, it is to be understood that the technology is not limited in its application to the details of construction and the arrangement of components set forth in the following description or illustrated in the following drawings. The technology is capable of other embodiments and of being practiced or of being carried out in various ways. Also, it is to be understood that the phraseology and terminology used herein is for the purpose of description and should not be regarded as limiting. Any implementation described herein as "exemplary" is not necessarily to be construed as preferred or advantageous over other implementations. The detailed description uses numerical and letter designations to refer to features in the drawings. Like or similar designations in the drawings and description have been used to refer to like or similar parts of the embodiments of the technology. As used herein, the terms "first", "second", and "third" may be used interchangeably to distinguish one component from another and are not intended to signify location or importance of the individual components, unless otherwise context dictates otherwise. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive- or. For example, a condition A or B is satisfied by any one of the following: A is true (or present) and B is false (or not present), A is false (or not present) and B is true (or present), and both A and B are true or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 2:
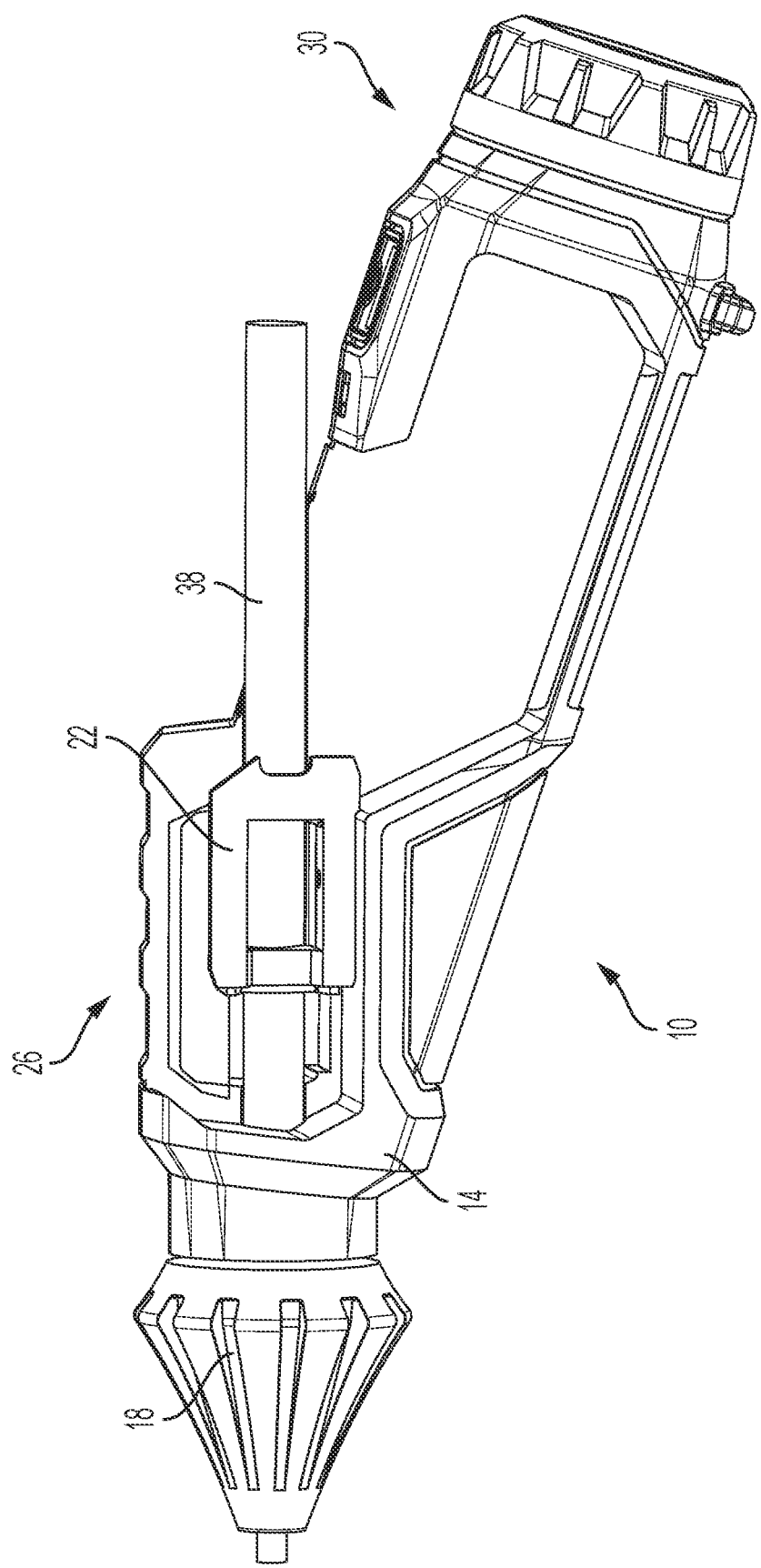
FIG. 2 is a side view of a portion of the glue pen of FIG. 1.

FIGS. 1 and 2 illustrate an exemplary glue pen 10 including a housing 14, a heater element 18 disposed in the housing 14, and a feed mechanism 22 that is coupled to the housing 14. The housing 14 includes a first housing region 26 and a second housing region 30 that are coupled together or otherwise formed (including as a single unitary structure) to encapsulate the heater element 18. The second housing region 30, in one aspect, defines a battery receptacle. The first housing region 26 and the second housing region 30 are configured to cooperatively receive a meltable substance, such as a glue stick 38. The illustrated embodiment displays a glue stick 38, but it is understood that any other substance configured to melt (i.e., a meltable adhesive substance) in response to relatively high temperatures may be substituted in place of the glue stick 38.

Figure 3A:
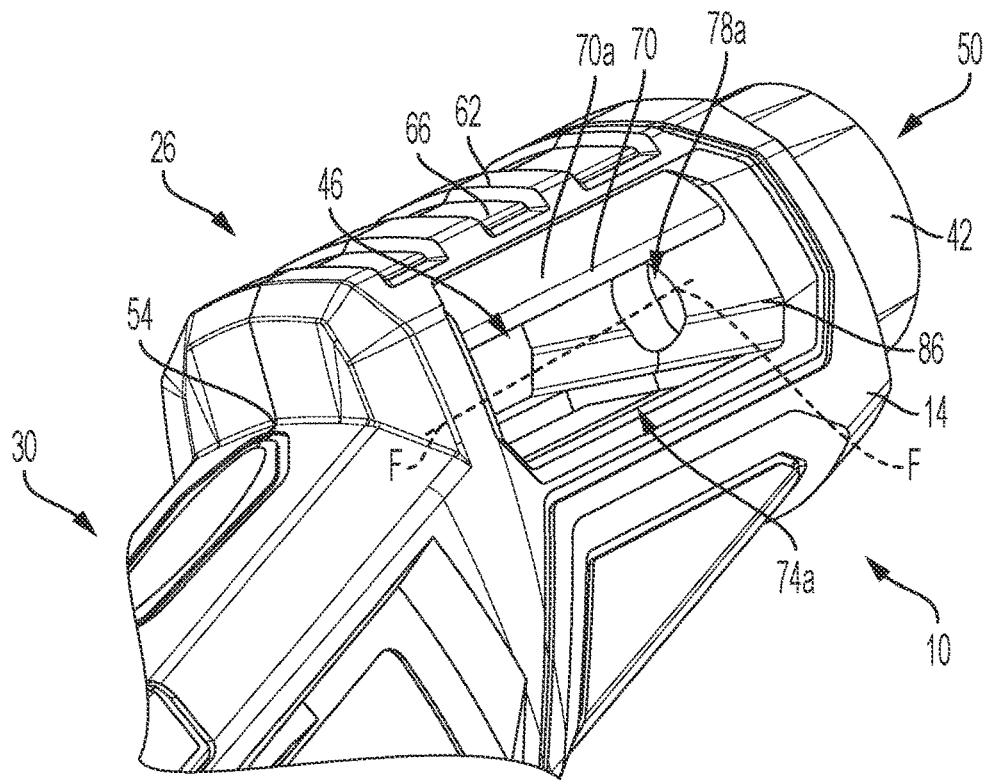
FIG. 3A is an enlarged perspective view of the housing of the glue pen of FIG. 1.

As illustrated in FIGS. 3A&B, the first housing region 26 includes a protrusion 42 extending from an end of the housing 26. As shown in FIG. 1, the feed mechanism 22 is disposed in a cavity 46 of the first housing region 26. The cylindrical protrusion 42 defines a first end, a heater element end, 50 of the first housing region 26. A second end of the first housing region 26 is defined by an intermediate point 54 where the first housing region 26 and the second housing region 30 meet. The second end of the first housing region 26 is further defined by a rear wall 58 of the cavity 46 and is positioned opposite the cylindrical protrusion 42 such that the cavity 46 extends between the rear wall 58 and the cylindrical protrusion 42. A top surface 62 of the first housing region 26 extends between the intermediate point 54 and the first end 50 and includes grooves 66 (e.g., three grooves). The grooves 66 may provide a user with easier and more ergonomic gripping of the glue pen 10.

The cavity 46 further includes a roof 70, a first pair of apertures 74a, 74b, and a second pair of apertures 78a, 78b. The roof 70 extends downwards from the top surface 62 of the first housing region 26. The first pair of apertures 74a, 74b are positioned on opposing sides of the glue pen 10 such that the first pair of apertures 74a, 74b form a through hole that defines the cavity 46. Further, the first pair of apertures 74a, 74b are generally rectangular and follow the contour of the housing 14. In the illustrated embodiment, the opposing sides are right and left sides of the first housing region 26. The apertures 74a, 74b open away from the glue pen 10. The roof 70 is positioned inwards of the apertures 74a, 74b such that the apertures 74a, 74b reveal downwardly depending sidewalls 70a, 70b of the roof 70. In addition, the roof 70 defines an upper boundary of the through hole, and thus, the cavity 46. In other embodiments, the first pair of apertures 74a, 74b may have different geometric openings such that the cavity 46 is variably defined by the shape of the first pair of apertures 74a, 74b.

The second pair of apertures 78a, 78b are positioned opposite each other. One of the second pair of apertures 78a, 78b is positioned on a front wall 86 of the cavity 46, and the other of the second pair of apertures 78a, 78b is positioned on the rear wall 58 of the cavity 46. The second pair of apertures 78a, 78b further define a first housing region axis F therebetween. The first housing region 26 is generally aligned along the first housing region axis F. The second pair of apertures 78a, 78b are generally circular in the illustrated embodiment. The front wall 86 is positioned adjacent the cylindrical protrusion 42 such that the aperture 78a positioned on the front wall 86 defines an opening for a through hole that extends through the cylindrical protrusion 42. The second pair of apertures 78a, 78b are in fluid communication with the cavity 46 such that the meltable substance may be conveyed between the second pair of apertures 78a, 78b through the cavity 46. Specifically, the meltable substance may be, but is not limited to, a glue stick 38 (FIG. 1). In other embodiments, apertures 78a, 78b for conveying a meltable substance may be shaped differently or positioned elsewhere on the glue pen 10.

Figure 4:
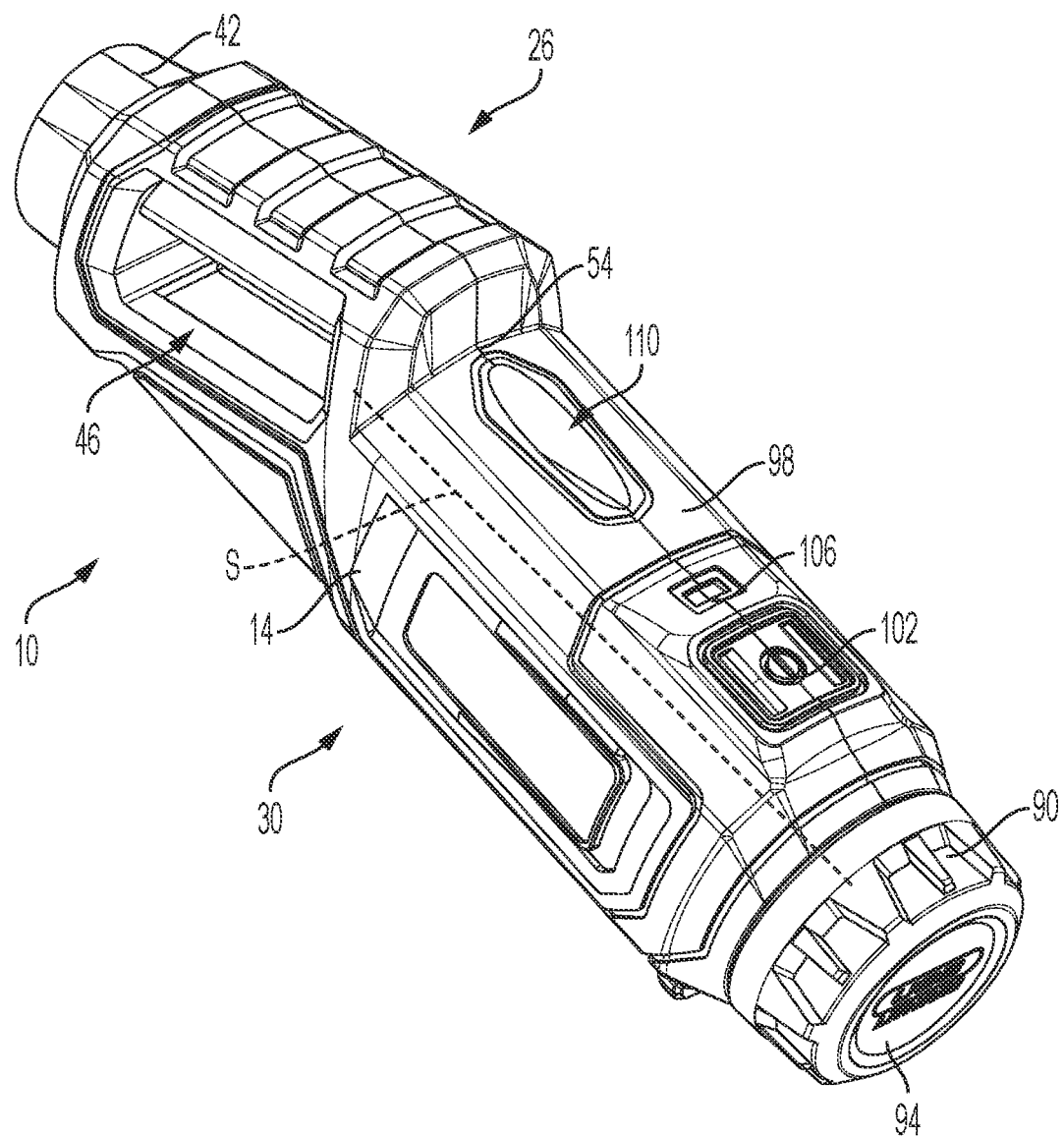
FIG. 4 is a rear perspective view of the housing of the glue pen of FIG. 1.
Figure 5:
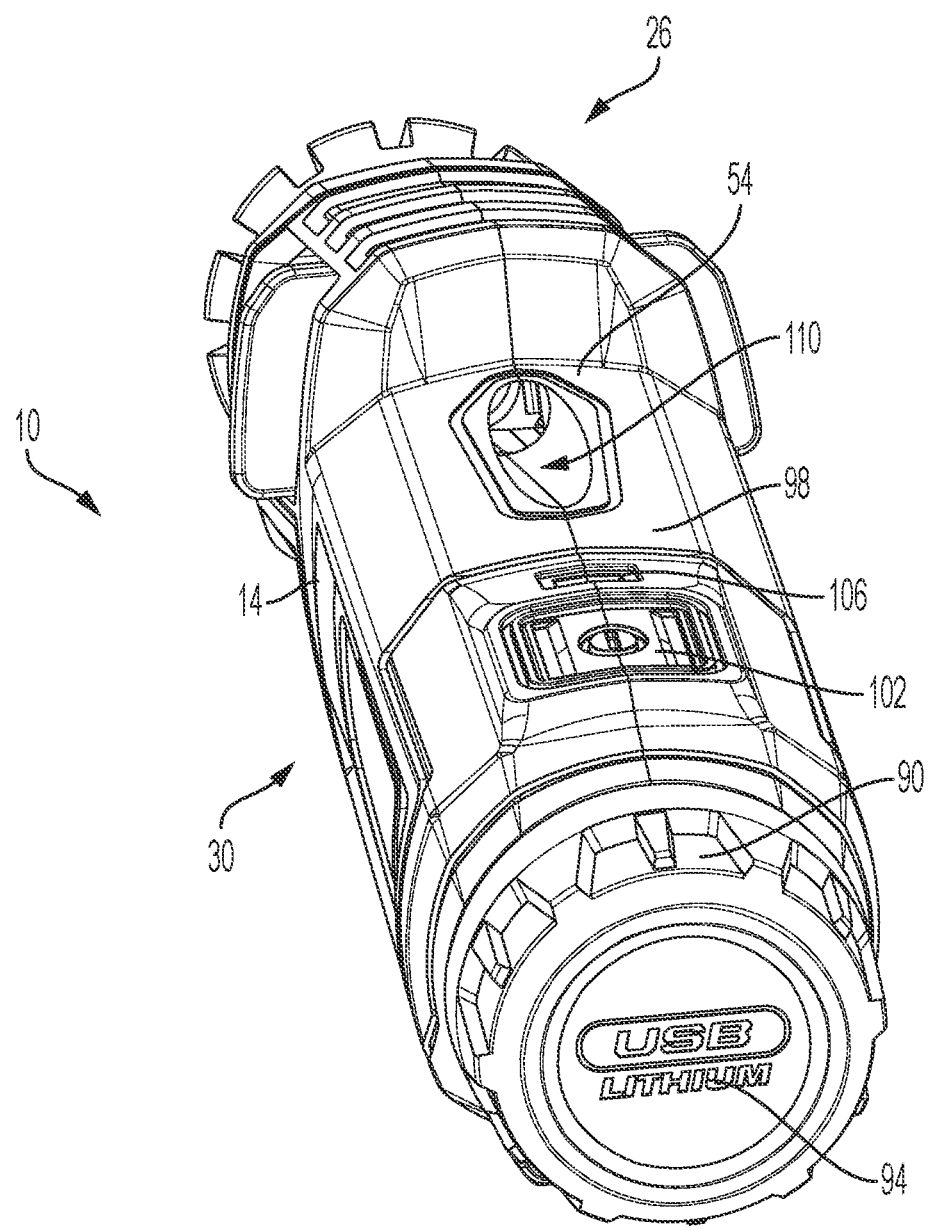
FIG. 5 is another rear perspective view of the housing of the glue pen of FIG. 1.
Figure 6:
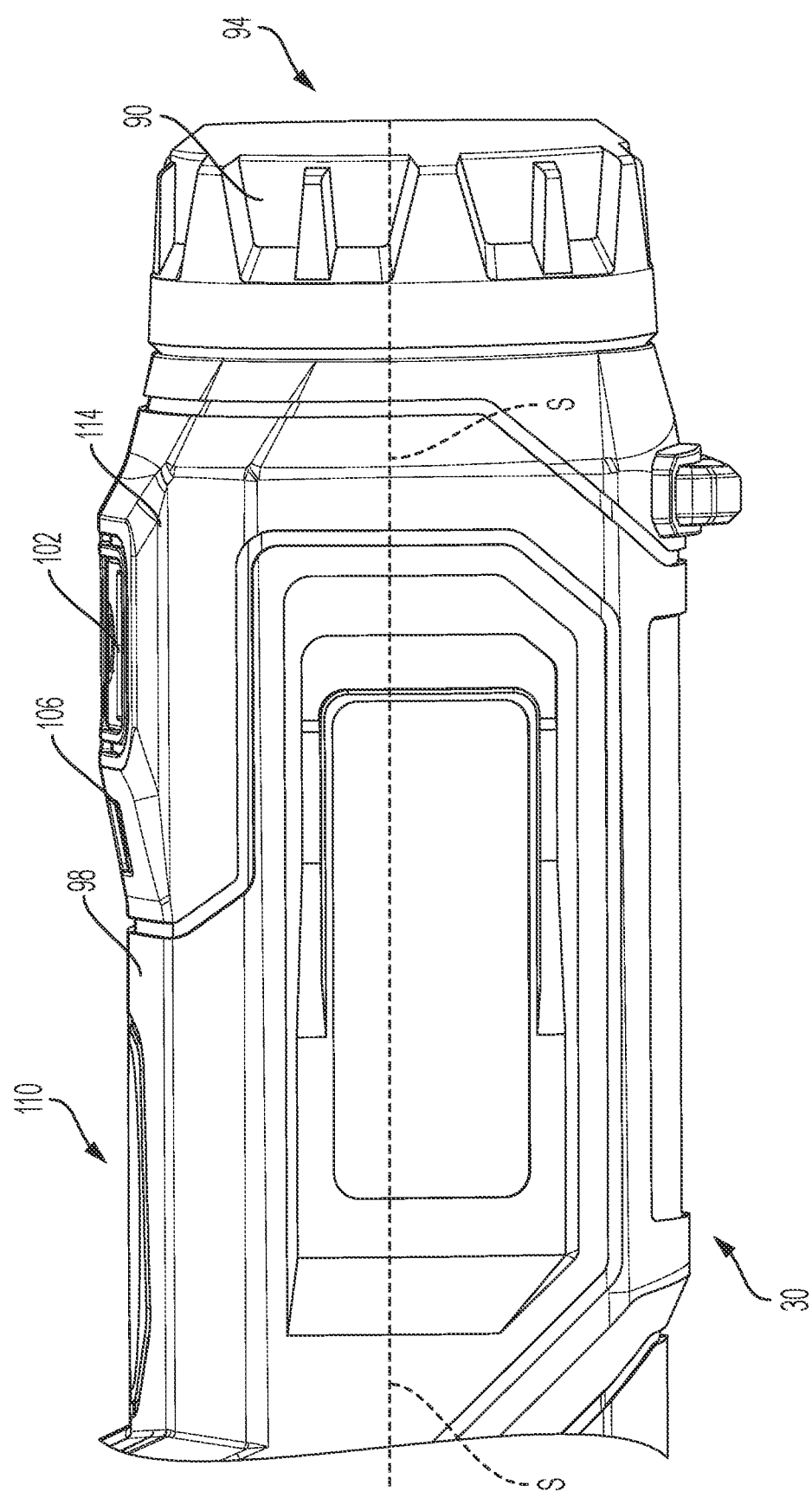
FIG. 6 is an enlarged side view of the housing of the glue pen of FIG. 1.

As best illustrated in FIGS. 4-6, the second housing region 30 is adjacent to and integrally formed with the first housing region 26. The second housing region 30 includes a generally circular rear endcap 90 that defines a first end, a battery end, 94 of the second housing region 30. The rear endcap 90 is removably coupled to the second housing region 30. The rear endcap 90 is removable such that a battery may be received in the second housing region. The second housing region 30 includes an indicator 106 (e.g., a light) that may provide an indication of the charge status for the battery received in the second housing region. In another embodiment, the battery may be fixedly positioned in the second housing region 30 and charged via a charge port positioned in second housing region 30. In another embodiment, the second housing region 30 may contain no battery and instead include an electrical connection, such as an A/C connection for receiving an A/C current to power the heater element 18.

Figure 3B:
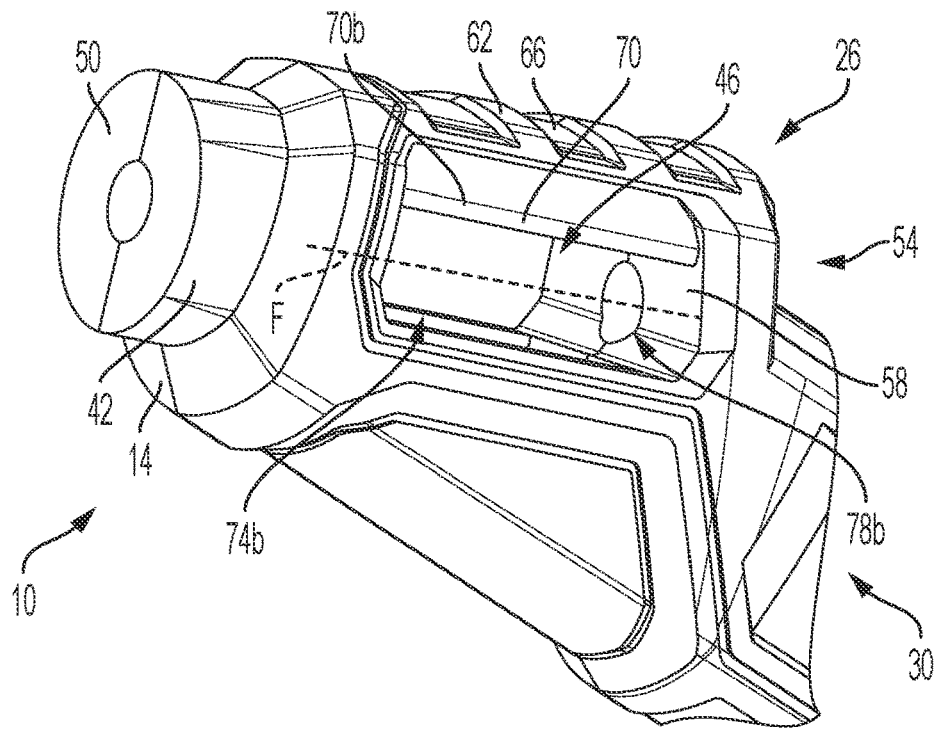
FIG. 3B is another enlarged perspective view of the housing of the glue pen of FIG. 1.

The second housing region 30 further includes a second end opposite the rear endcap 90. The second end of the first housing region 26 and the second end of the second housing region 30 are coincident at the intermediate point 54. A second housing region axis S is defined between the first end 94 of the second housing region 30 and the intermediate point 54 through the center of the rear endcap 90. The second housing region axis S, and thus the second housing region 30, is angled relative to the first housing region axis F (FIG. 3A), and thus the first housing region 26. More specifically, the second housing region axis S is oriented such that the second housing region axis S is not parallel nor perpendicular to the first housing region axis F (FIG. 3A). In the illustrated embodiment, the second housing region axis S is oriented relative to the first housing region axis F (FIG. 3B) at an angle that is less than 45 degrees and greater than 0 degrees.

A top surface 98 of the second housing region 30 extends between the first end 94 of the second housing region 30 and the intermediate point 54. The top surface 98 includes a power button 102, an indicator light 106, and a slot or feed cavity 110 that defines a first axis along which the glue stick 38 is actuated during use of the glue pen 10. In the illustrated embodiment, the power button 102 is positioned proximal the rear endcap 90 on a raised portion 114 of the top surface 98. More specifically, the raised portion 114 slopes up from the rear endcap 90, plateaus, and slopes downwards in the direction of the intermediate point 54. The power button 102 is generally rectangular. The indicator light 106 is positioned adjacent the power button 102 on the downward sloping portion of the raised portion 114. The illustrated indicator 106 is generally rectangular and smaller than the power button 102, although other shapes or configurations for the indicator 106 are possible and considered herein. The indicator 106 indicates the charge status of the battery that is disposed in the second housing region 30. The feed cavity 110 is positioned adjacent the intermediate point 54 and extends from the intermediate point 54 towards the raised portion 114. Further, the feed cavity 110 is in communication with the cavity 46 in the first housing region 26. More specifically, and with further reference to FIGS. 3A&B, the feed cavity 110 is in communication with the cavity 46 through the aperture 78b positioned on the rear wall 58 of the cavity 46. The glue stick 38 may be inserted into the feed cavity 110 to be conveyed through the cavity 46 between the second pair of apertures 78a, 78b.

Figure 7:
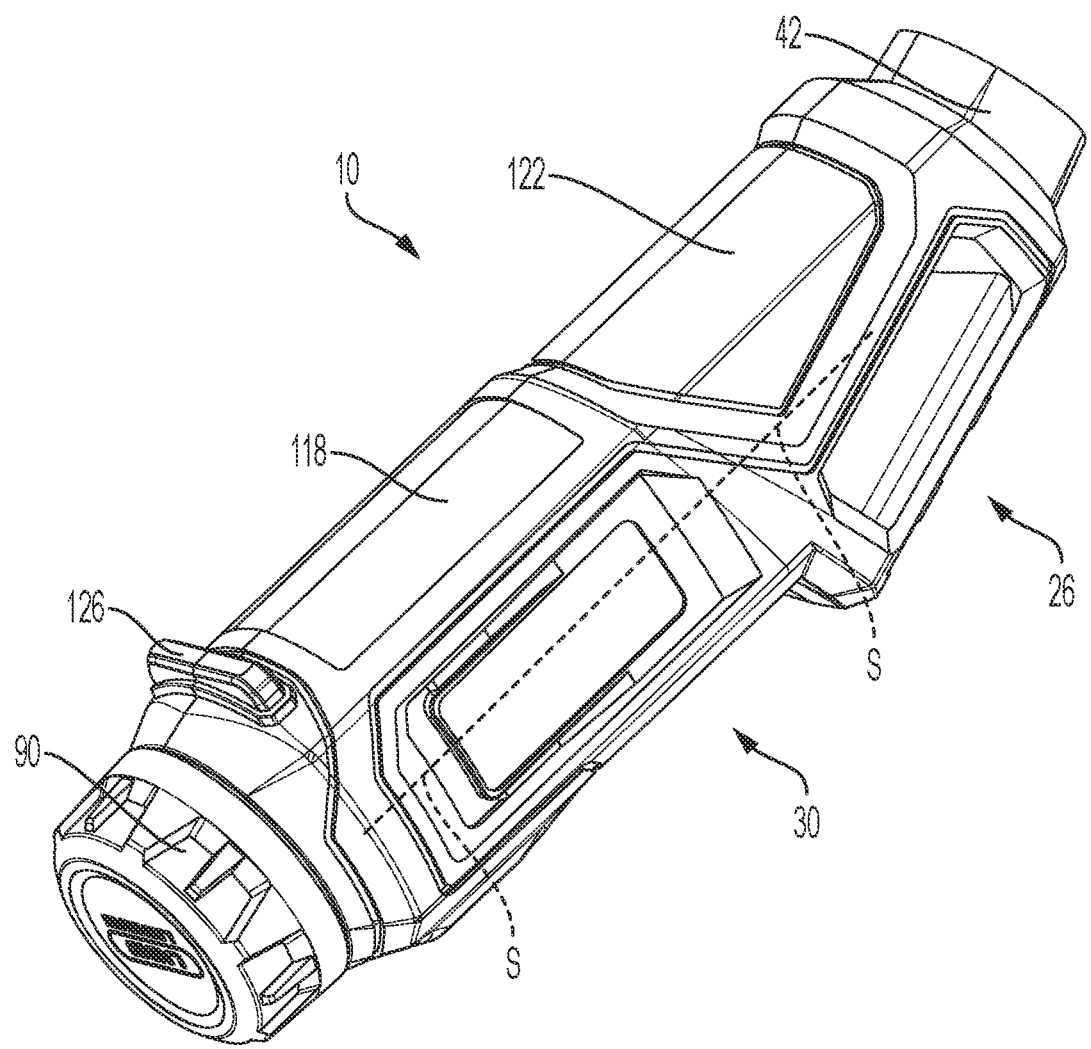
FIG. 7 is a bottom perspective view of the housing of the glue pen of FIG. 1.

As shown in FIG. 7, the first housing region 26 and the second housing region 30 collectively form a bottom surface 118 extending between the cylindrical protrusion 42 and the rear endcap 90. The bottom surface 118 is generally parallel to the second housing region axis S. The bottom surface 118 includes an indented grip 122 and a support member 126. The indented grip 122 is positioned proximal the cylindrical protrusion 42 and generally opposite the plurality of grooves 66 on the top surface 62 of the first housing region 26 as best shown in FIGS. 3A&B. The indented grip 122 and the plurality of grooves 66 cooperatively provide a user with an easier and more ergonomic grip. The support member 126 is positioned adjacent the rear endcap 90 and is generally rectangular. The support member 126 protrudes from the bottom surface 118 of the glue pen 10 and is configured to be placed upon an external surface such that the glue pen 10 may remain upright (e.g., with the top surface 62 facing upwards) while not in use.

Figure 8:
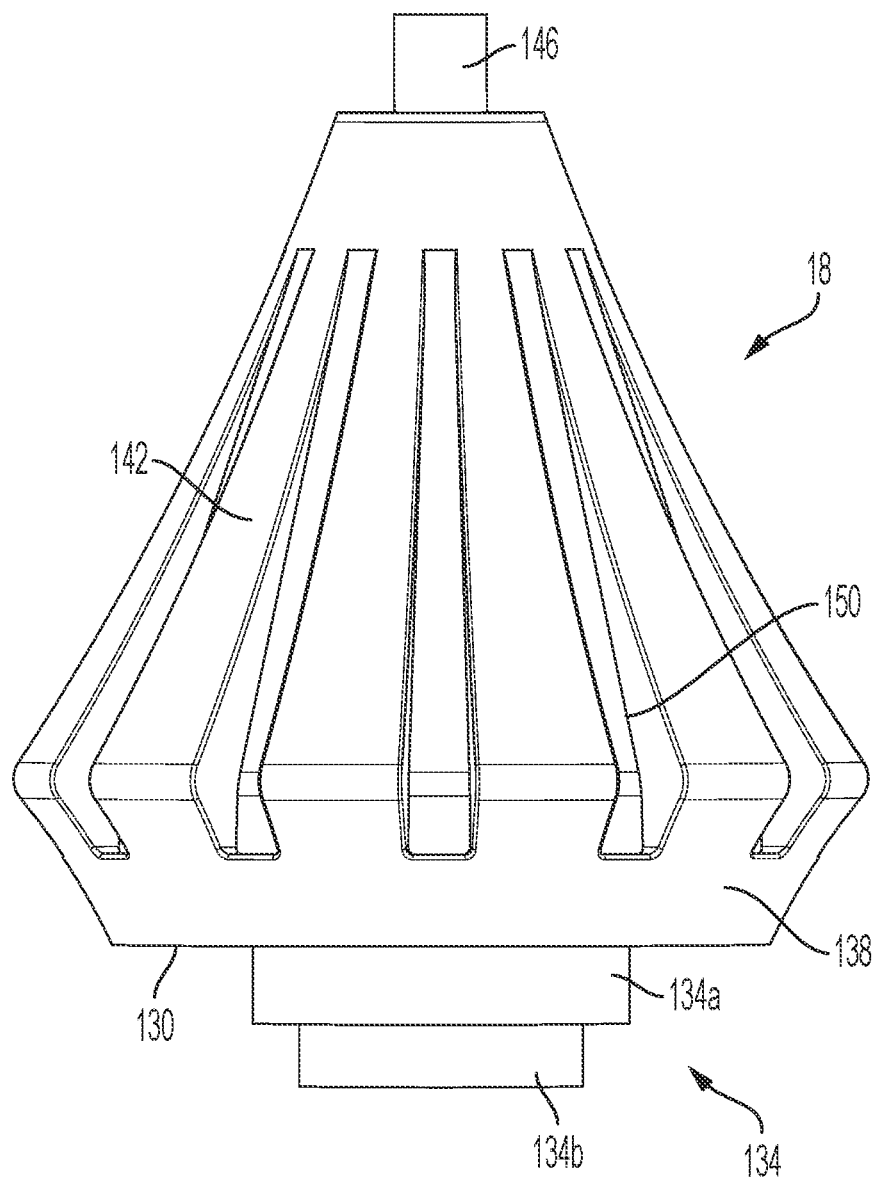
FIG. 8 is a front view of the heater element of the glue pen of FIG. 1.
Figure 9:
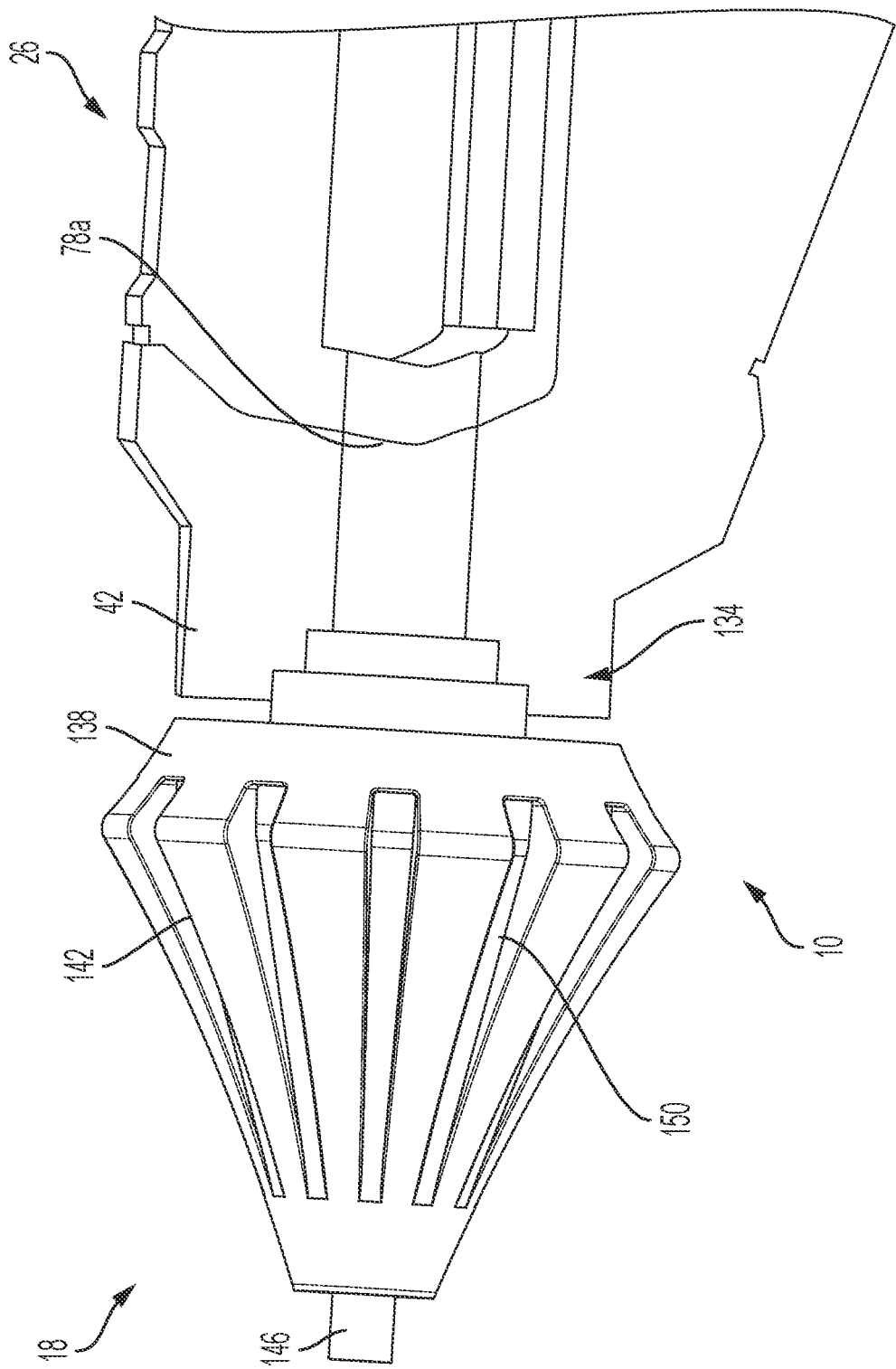
FIG. 9 is an enlarged side view of the heater element of the glue pen of FIG. 1 disposed in a portion of the housing.
Figure 10:
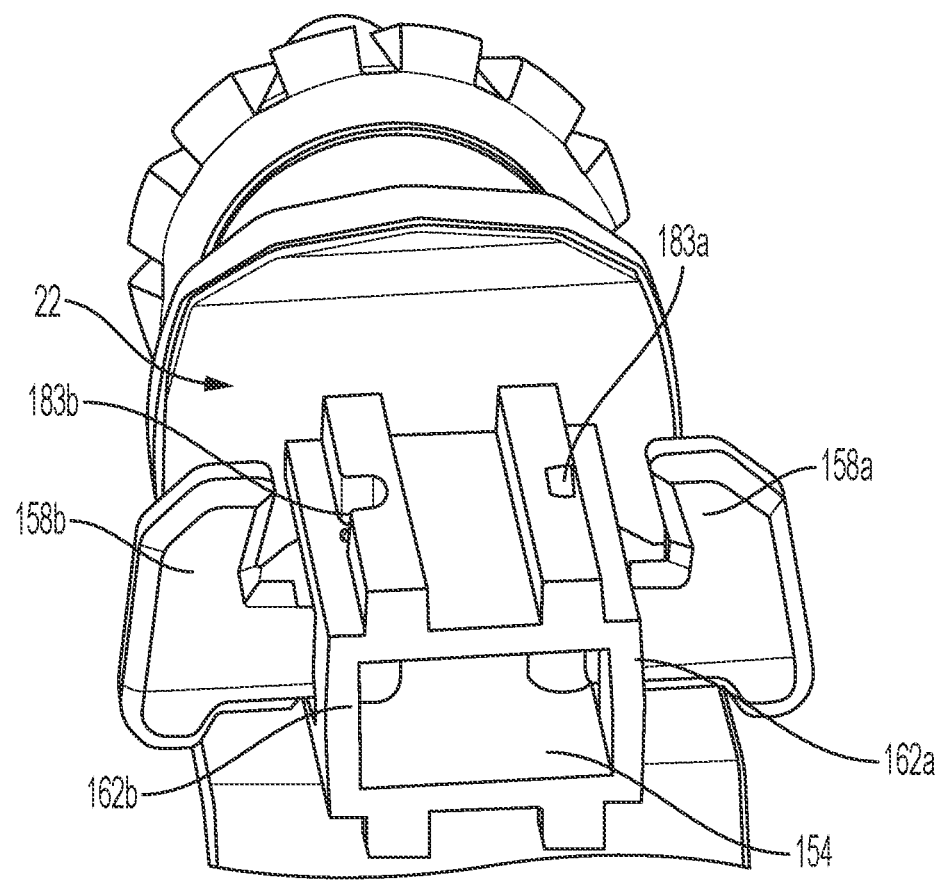
FIG. 10 is a rear perspective view of a portion of the glue pen of FIG. 1.

FIGS. 8 and 9 illustrate the heater element 18. The heater element 18 includes a base 130, a coupling portion 134, an outwardly extending portion 138, a cone portion 142, and a dispensing tube (e.g., an output end) 146. The base 130 is a planar circular surface having generally the same radius as the cylindrical protrusion 42 of the first housing region 26. The coupling portion 134 extends outwards from the base 130 in the direction of the first housing region 26 and includes a pair of cylinders 134a, 134b configured to be received in the cylindrical protrusion 42. The outwardly extending portion 138 extends from the base 130 in an opposite direction from the coupling portion 134 (e.g., opposite from the first housing region 26). The outwardly extending portion 138 further extends radial outwards to a maximum radial position of the heater element 18. The cone portion 142 extends from the maximum radial position and slopes inwards to the dispensing tube 146. A plurality of channels 150 is evenly distributed around the heater element 18 and extend from a position in the outwardly extending portion 138 to a position adjacent the top of the cone portion 142. In the illustrated embodiment, the dispensing tube 146 is a hollow tube in communication with the second pair of apertures 78a, 78b of the first housing region 26 when the heater element 18 is disposed in the housing 14. The dispensing tube 146 has a smaller radius than the second pair of apertures 78a, 78b.

Figure 13A:
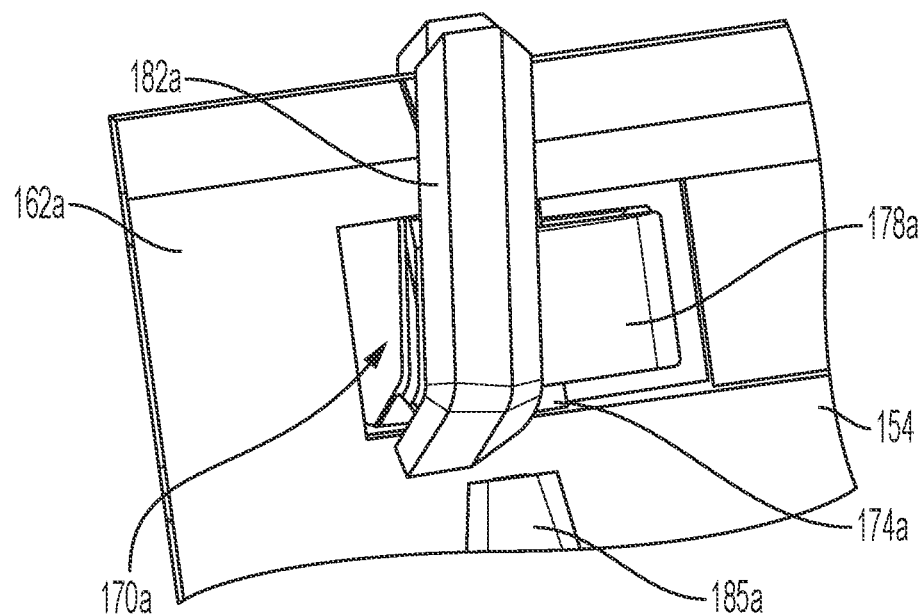
FIG. 13A is a right side view of the feed mechanism of the glue pen of FIG. 1.
Figure 13B:
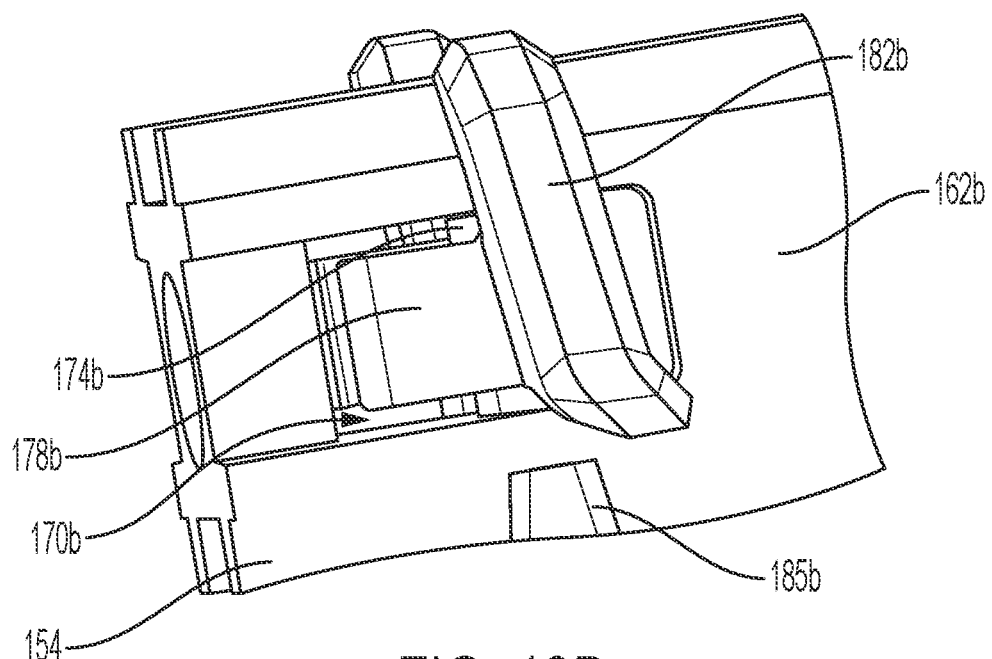
FIG. 13B is a left side view of the feed mechanism of the glue pen of FIG. 1.
Figure 14A:
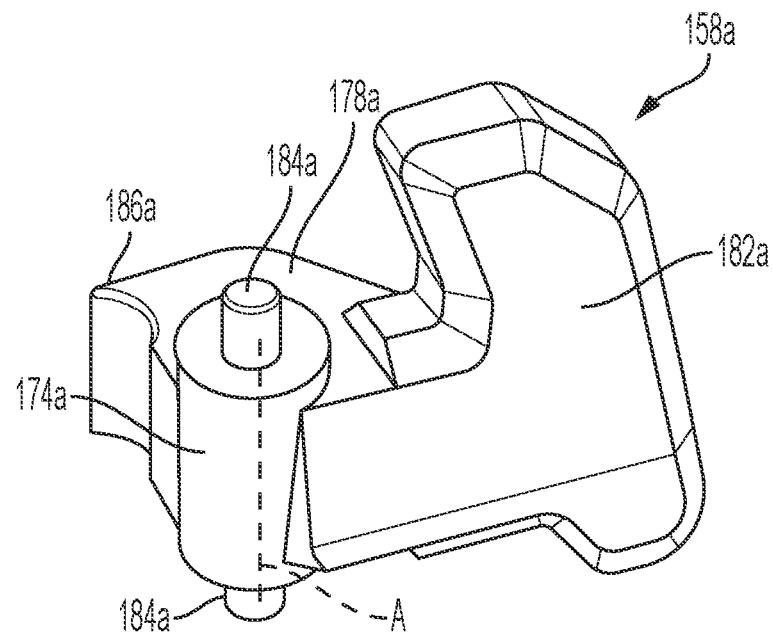
FIG. 14A is a perspective view of a portion of the feed mechanism of the glue pen of FIG. 1.
Figure 14B:
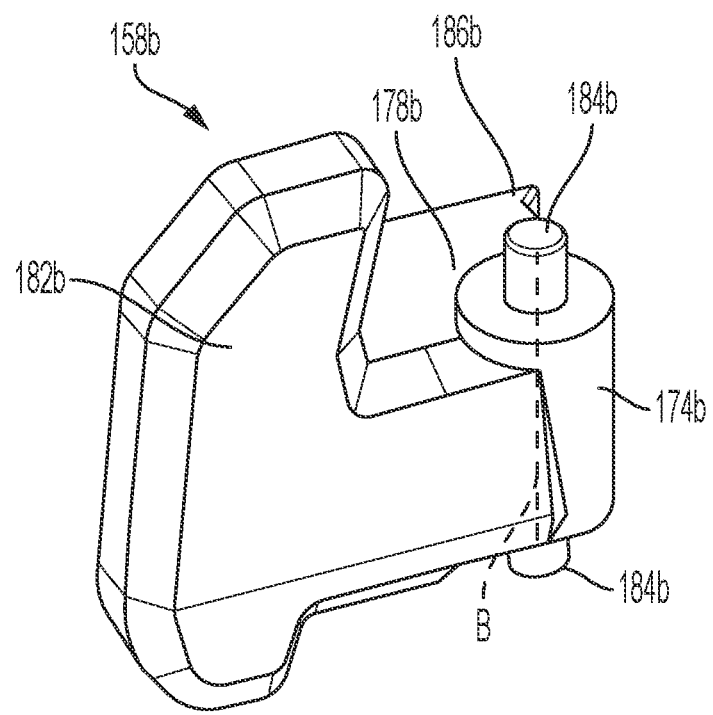
FIG. 14B is a perspective view of a portion of the feed mechanism of the glue pen of FIG. 1.
Figure 15:
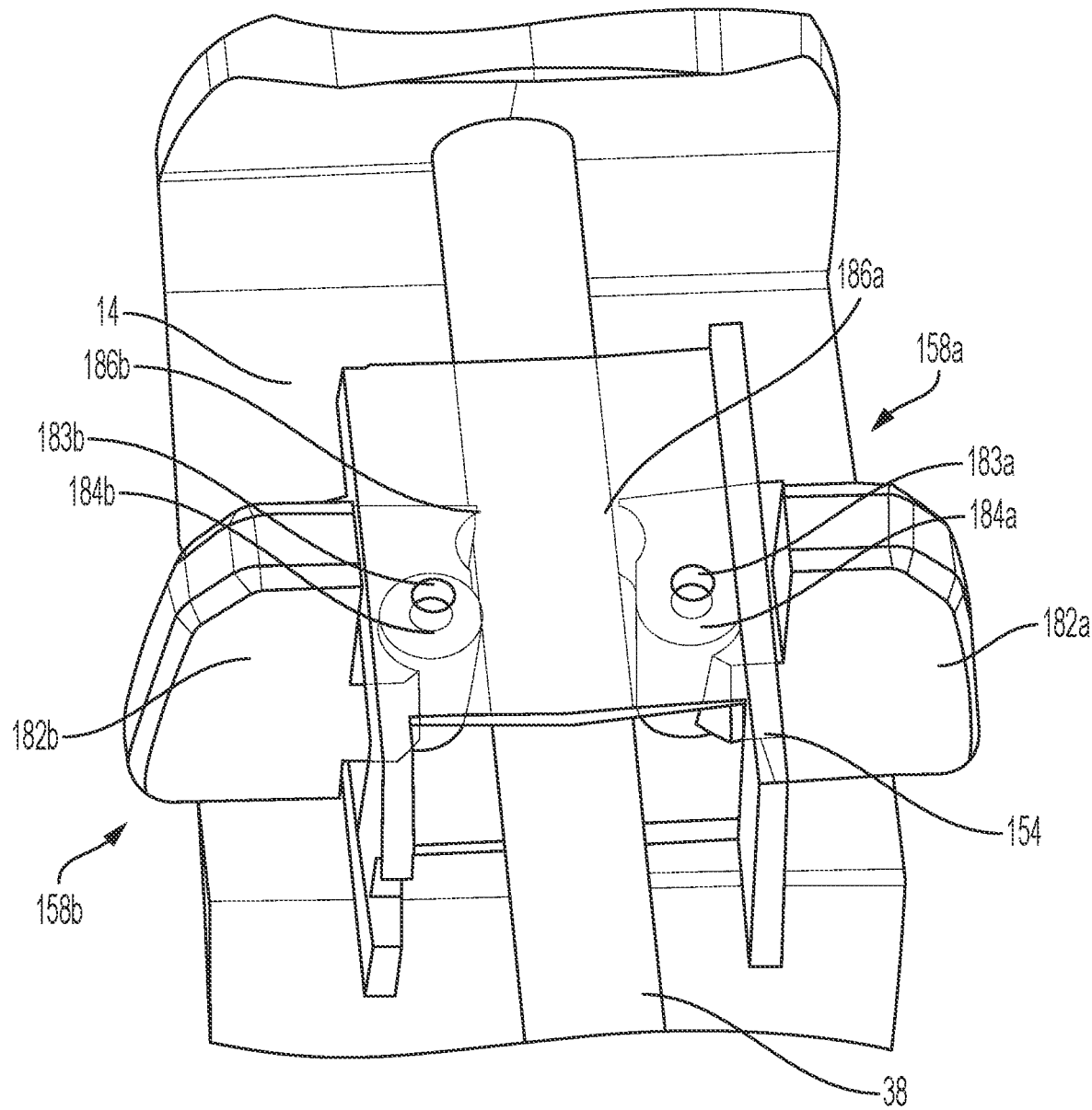
FIG. 15 is a perspective view of a portion of the glue pen of FIG. 1
Figure 16:
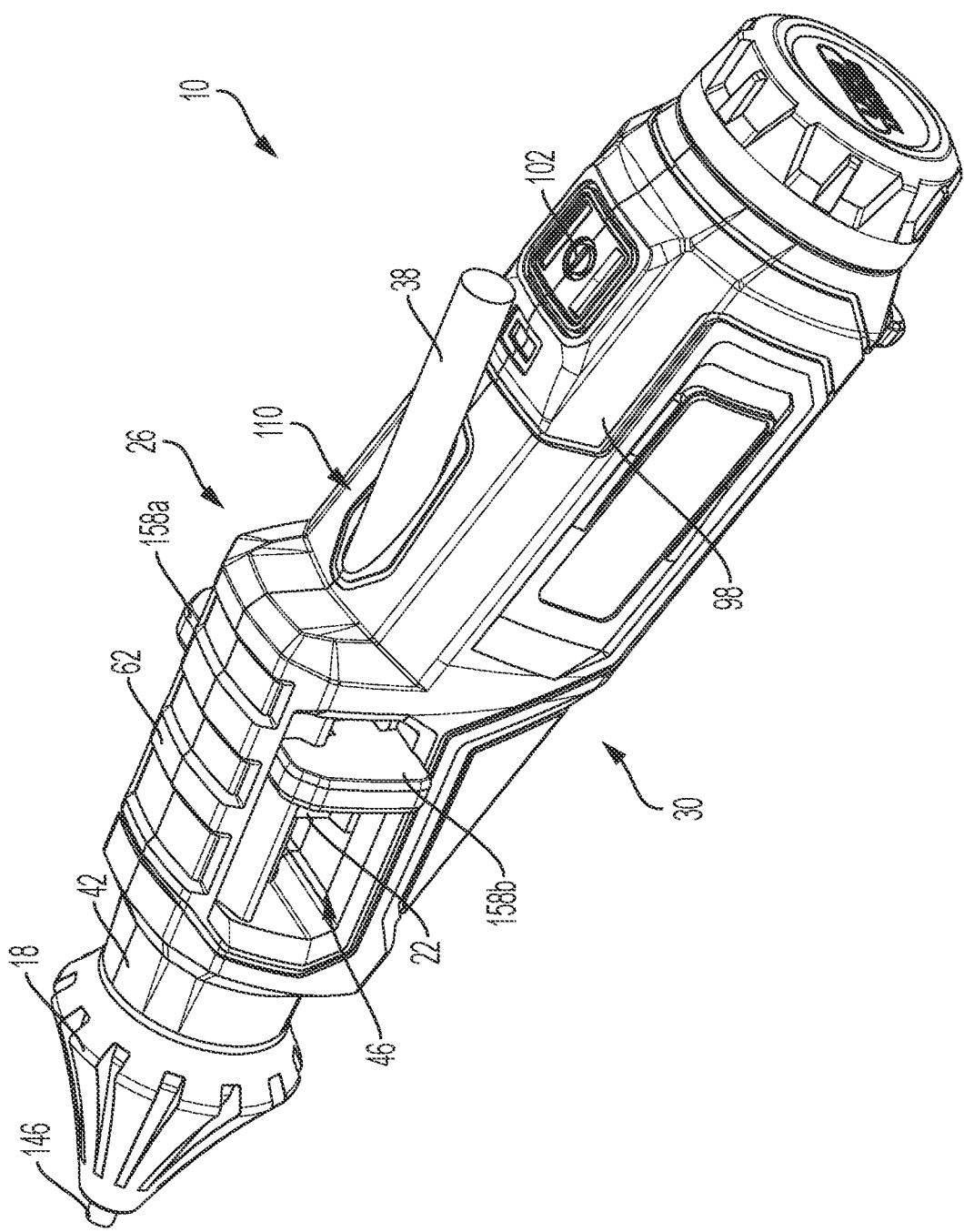
FIG. 16 is a rear perspective view of the glue pen of FIG. 1.

As illustrated in FIGS. 10-12 and 16, the feed mechanism 22 couples to the first housing region 26 (FIG. 1) and includes a feed mechanism support 154, a first actuator 158a that is positioned on a first side of the housing 14, and a second actuator 158b that is positioned on a second side of the housing 14. With additional reference to FIGS. 3A and 3B, the feed mechanism support 154 includes a pair of walls 162a, 162b adjacent the first pair of apertures 74a, 74b in the first housing region 26 and a feed tube 166. The pair of walls 162a, 162b include windows 170a, 170b (see FIGS. 13A and 13B) for receiving each actuator 158a, 158b. The pair of walls 162a, 162b extend upwards from the bottom of the cavity 46 to the roof 70 of the cavity 46. The feed tube 166 is positioned between the pair of walls 162a, 162b. In addition, the feed tube 166 extends upwards from the bottom of the cavity 46 to the roof 70 of the cavity 46 and has a through hole positioned therebetween. The through hole of the feed tube 166 is of generally the same size and shape as the second pair of apertures 78a, 78b such that the through hole is in communication with the second pair of apertures 78a, 78b.

Figure 11:
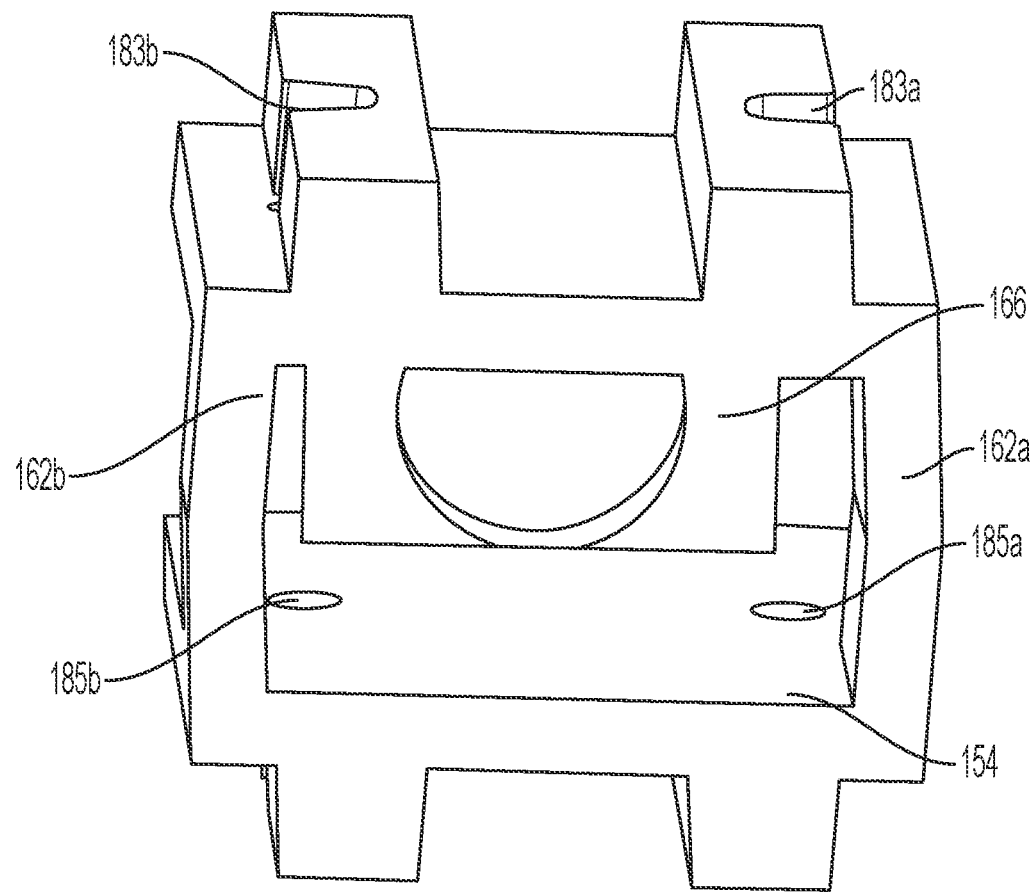
FIG. 11 is a rear perspective view of the feed mechanism of the glue pen of FIG. 1.
Figure 12:
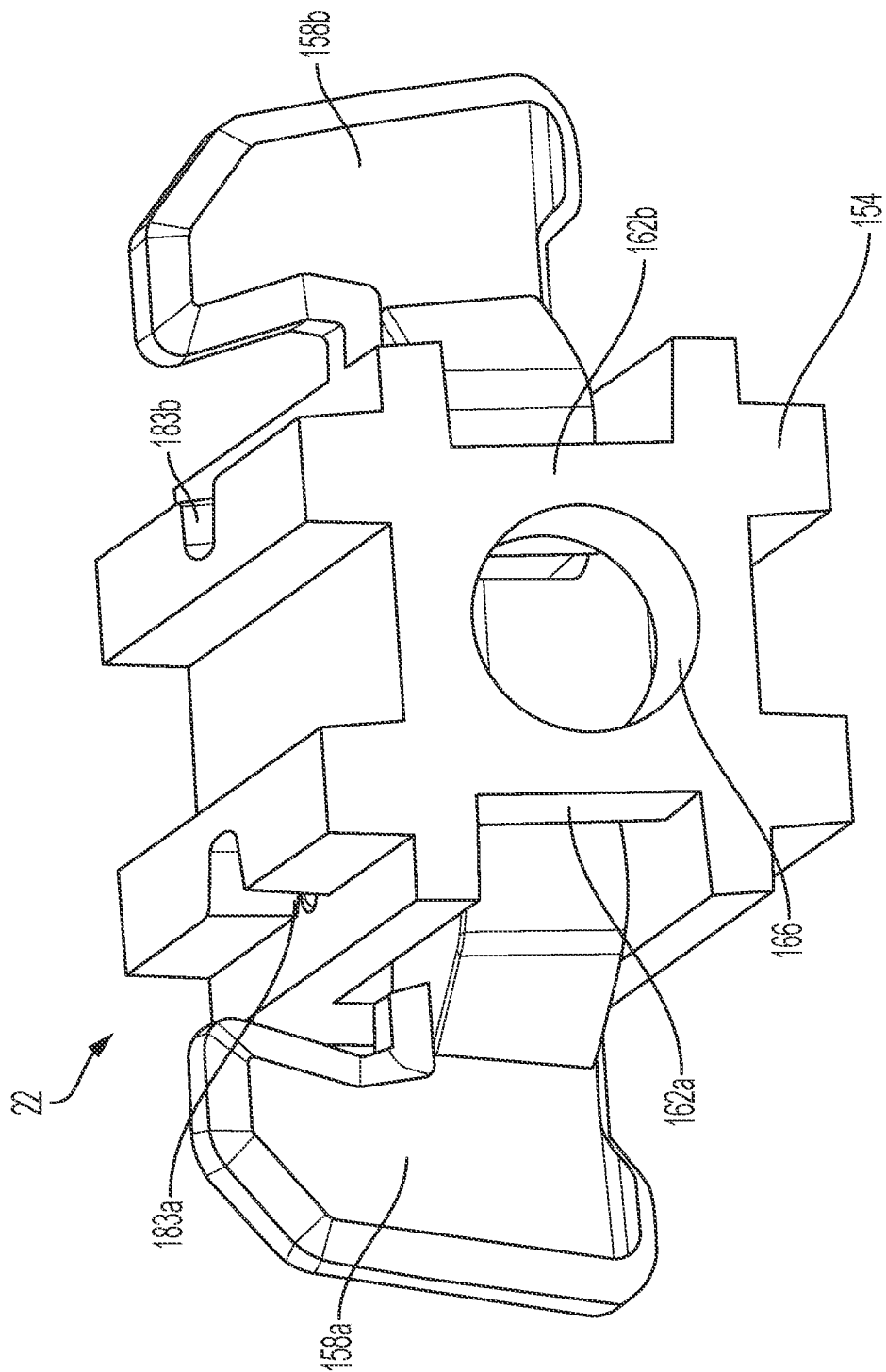
FIG. 12 is a perspective view of the feed mechanism of the glue pen of FIG. 1.

As best illustrated in FIGS. 13A-15, the actuators 158a, 158b are symmetrically identical (i.e., mirror images) and are disposed in the cavity 46 and extend outward from the windows 170a, 170b. Each actuator 158a, 158b includes a pivot portion 174a, 174b, an actuator portion 178a, 178b (e.g., a protruding portion), and a tab 182a, 182b. Each of the pivot portions 174a, 174b is positioned within the feed mechanism support 154 and defines a pivot 184a, 184b that permits pivotal or rotational movement of the corresponding actuator 158a, 158b around a respective second axis A or a third axis B due to engagement with holes 183a, 185a and 183b, 185b in the feed mechanism support 154 (FIG. 11). The first actuator 158a is pivotable toward and away from the feed cavity 110 about the second axis A to engage with or disengage from the glue stick 38. The second actuator 158b is pivotable toward and away from the feed cavity 110 about the third axis B to engage with and disengage from the glue stick 38. The second axis A is substantially parallel to the third axis B. The actuator portions 178a, 178b extend from the pivot portions 174a, 174b outwards from the windows 170a, 170b and in the direction of the heater element end 50 of the housing 14.

Each of the first actuator portion 178a and the second actuator portion 178b includes a respective material engaging edge 186a, 186b. Each of the material engaging edges 186a, 186b extends outward from the actuator portions 178a, 178b toward the cavity 46 to selectively engage the glue stick 38. The first and second tabs 182a, 182b extend beyond the upper and lower extents of the apertures 74a, 74b (see FIGS. 3A and 3B), respectively, to provide a relatively large engagement surface, and to guide movement of the actuators 158a, 158b toward and away from the heater element 18 along the sidewalls 70a, 70b (see FIGS. 3A and 3B), respectively.

Figure 17:
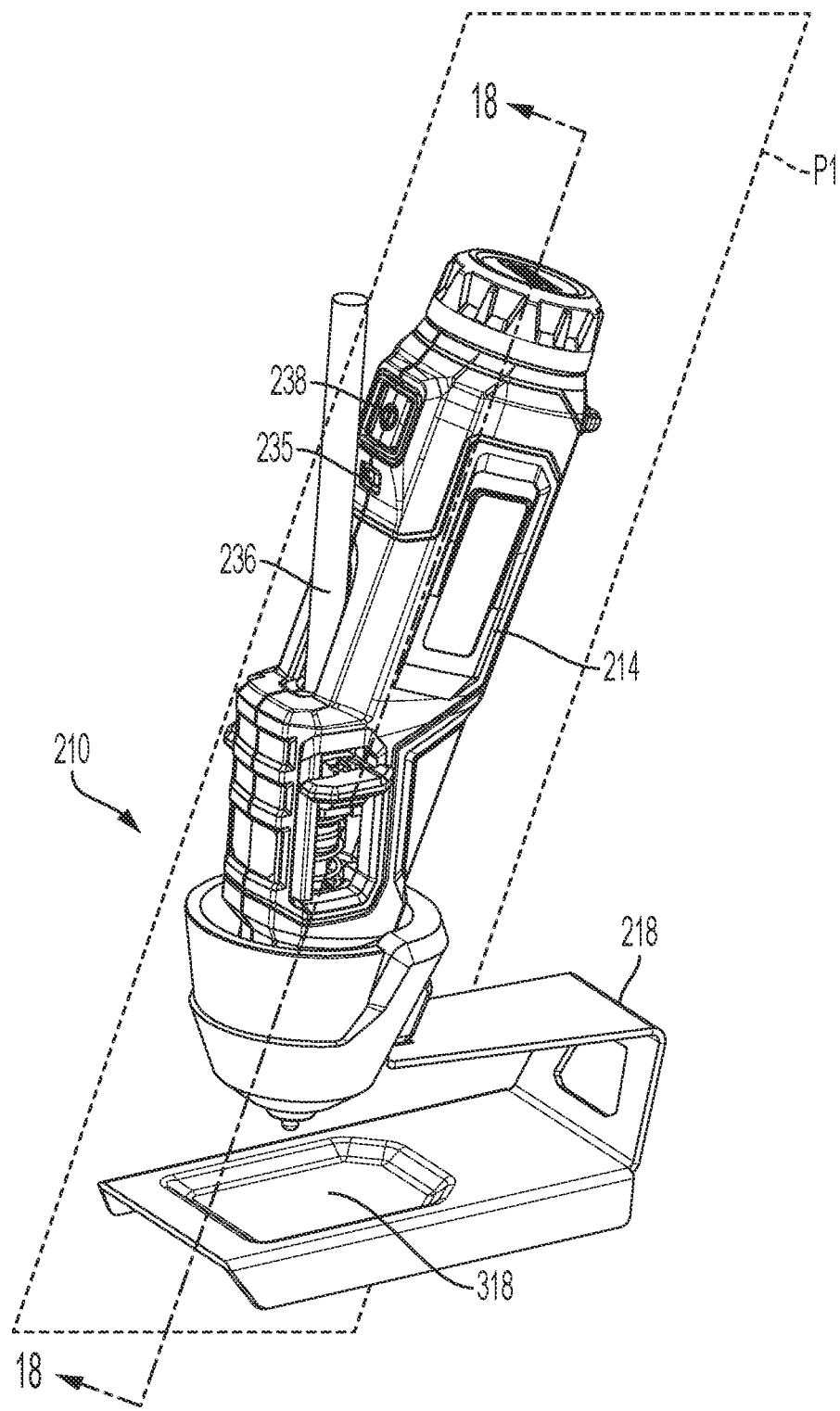
FIG. 17 is a perspective view of a glue pen assembly including a glue pen and a glue pen stand according to another embodiment of the disclosure, the glue pen including a feed mechanism.
Figure 18:
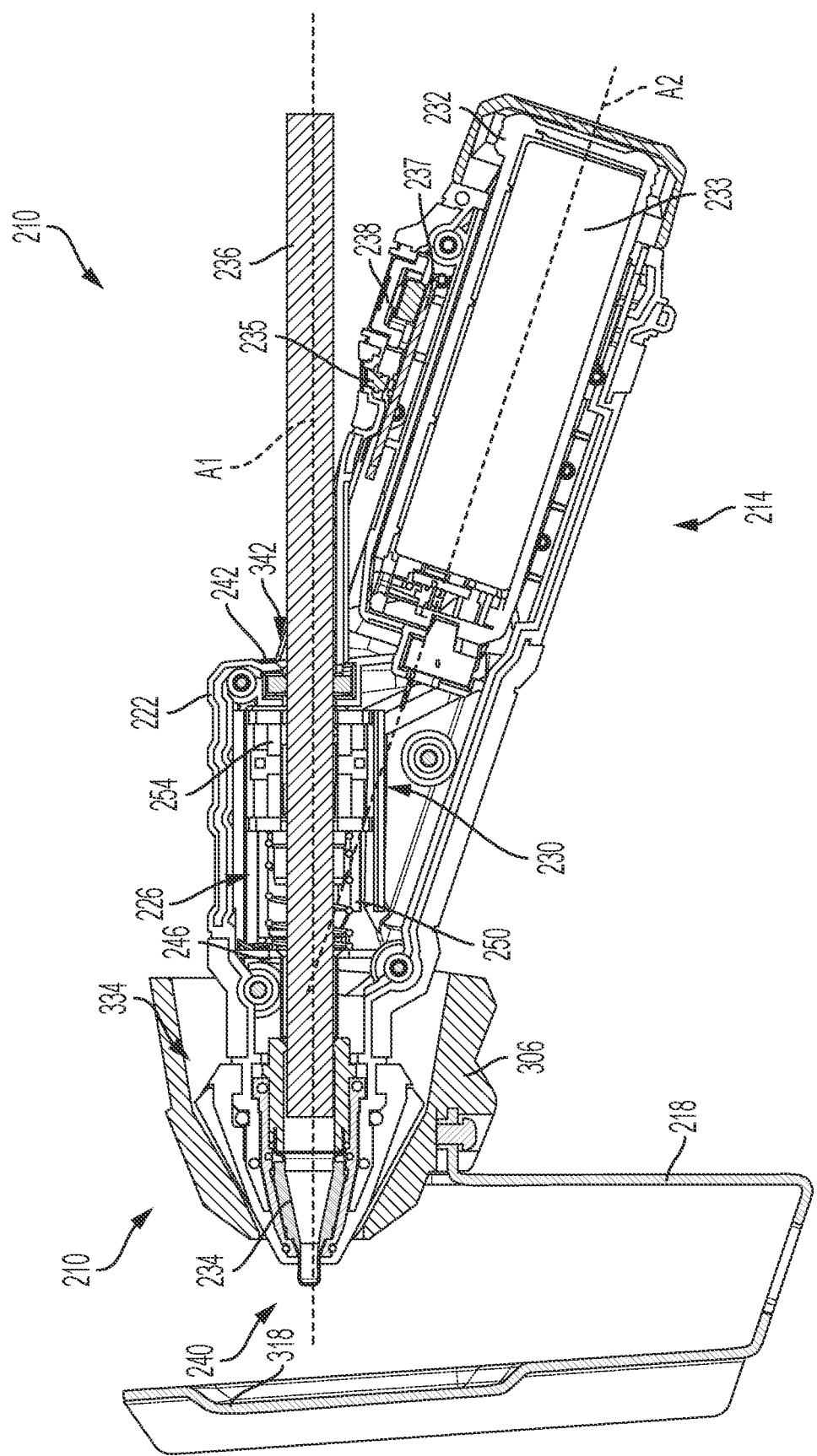
FIG. 18 is a section view of the glue pen of FIG. 17 taken along line 18-18.
Figure 19A:
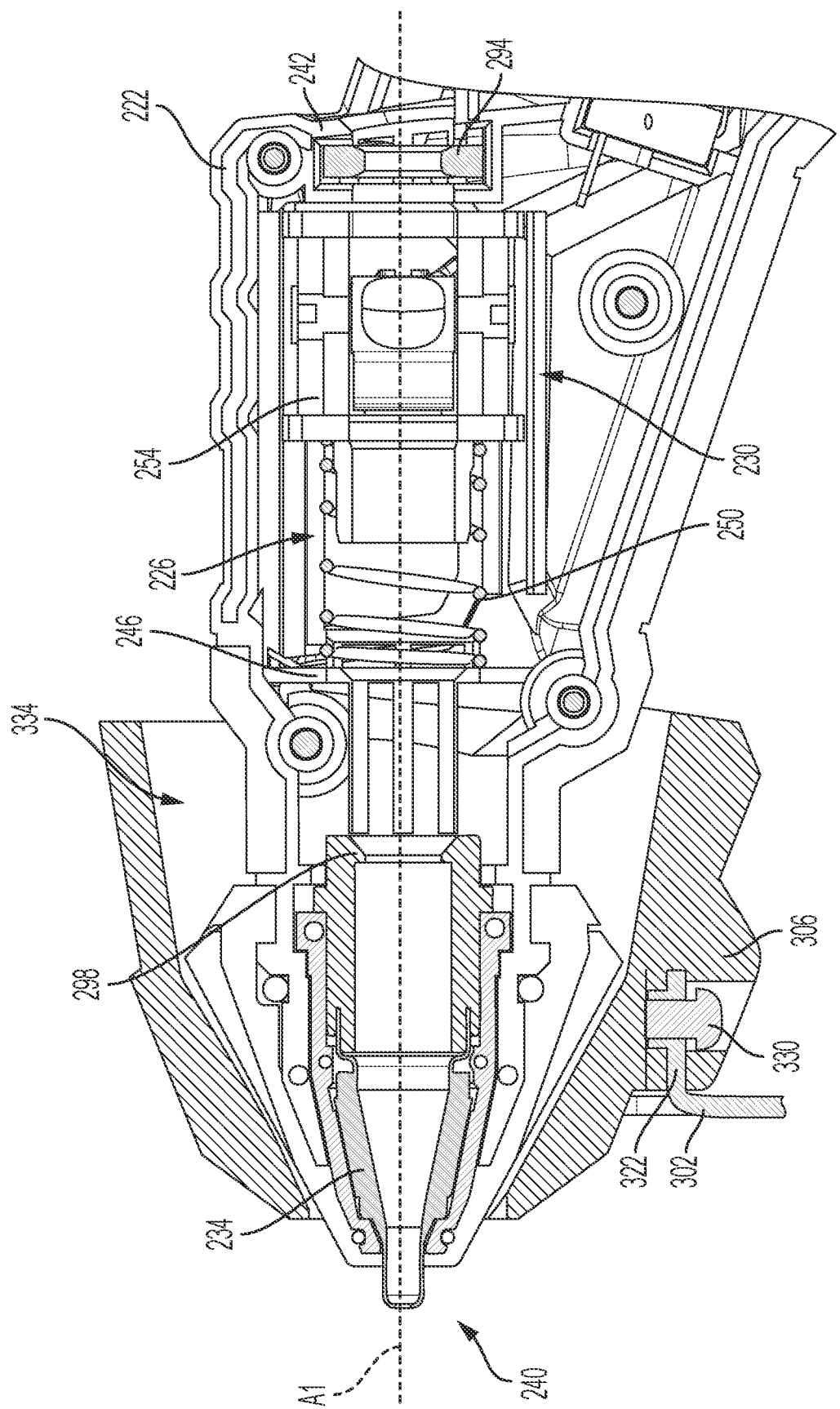
FIG. 19A is an enlarged section view of the glue pen.
Figure 19B:
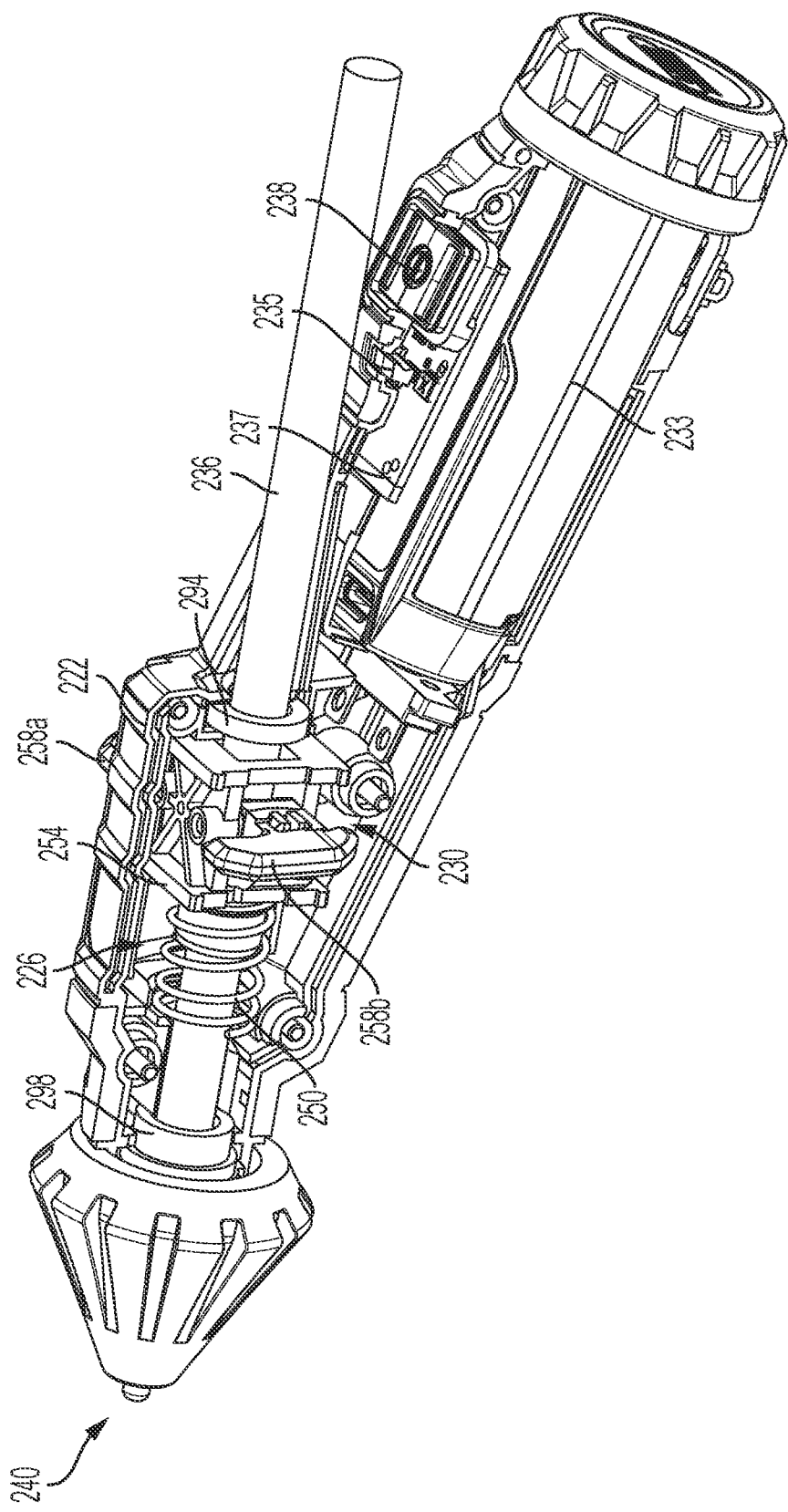
FIG. 19B is a perspective view of the glue pen with a portion of a housing for the glue pen removed.

FIGS. 17-25 illustrate another exemplary glue pen assembly 210 including a glue pen 214 and a stand 218. The glue pen 214 may be coupled to and supported by the stand 218 while the glue pen 214 is not in use. Although the stand 218 is described with reference to the glue pen 214, it should be understood that the glue pen 10 may be supported by the stand 218. As illustrated in FIGS. 18 and 19, the glue pen 214 includes a housing 222 that defines a cavity 226 and that supports a feed mechanism 230 disposed in the cavity 226, a battery casing 232 that supports a battery unit 233, a heater element 234 (e.g., a resistive heater to heat and melt an adhesive product such as a glue stick 236), an indicator light 235, a circuit board 237, and a power button 238. The housing 222 has a first end 240, an output end, and the heater element 234 is disposed in the housing 222 adjacent to or at the first end 240. The cavity 226 extends along a first or feed axis A1 of the housing 222 and is shaped to receive the glue stick 236 at an insertion opening 242 to the cavity 226.

With reference to FIGS. 17 and 18, the housing 222 includes a grip portion 248 that defines a grip axis A2 that is oriented at a non-zero angle (e.g., an acute angle) relative to the feed axis A1. In the illustrated embodiment, the grip axis A2 extends at an angle that is less than approximately 45 degrees relative to the feed axis A1, although other angles are possible and considered herein. As such, the grip axis A2 intersects the feed axis A1 and, together, the feed axis A1 and the grip axis A2 lie in a glue pen plane P1. The glue pen plane P1 bisects the glue pen 214 through the middle of the glue pen 214 such that the portion of the glue pen 214 on a first side (e.g., a left side) of the plane P1 is symmetrical to the portion of the glue pen 214 on a second side (e.g., a right side) of the plane.

With reference to FIGS. 19 and 20A-20C, the feed mechanism 230 is disposed in the cavity 226 and includes a spring 250 and a feed mechanism support 254. The spring 250 is coupled between a heater element end 246 of the cavity 226 and the feed mechanism support 254 to bias the feed mechanism support 254 away from the heater element 234 along the feed axis A1. The glue stick 236 is insertable into the feed mechanism support 254, which guides the glue stick 236 toward the heater element 234 as described in detail below.

The feed mechanism 230 also includes a first actuator 258a, a second actuator 258b, a first pivot rod 262a, and a second pivot rod 262b. The first actuator 258a is positioned on and extends from a first side of the housing 222, and the second actuator 258b is positioned on and extends from a second side of the housing 222 that is opposite the first side. Stated another way, the first actuator 258a extends from the housing 222 in a direction that is transverse to the glue pen plane P1 on the first side of the plane P1, and the second actuator 258b extends from the housing 222 in a direction that is transverse to the glue pen plane P1 on the second side of the plane P1. In some embodiments, the actuators 258a, 258b may be oriented such that the actuators 258a, 258b extend perpendicular to the plane P1 and in an opposite direction relative to each other. Each of the actuators 258a, 258b includes a respective first portion 266a, 266b and a respective second portion 270a, 270b. Each of the first portions 266a, 266b includes a tab 274a, 274b. Each of the second portions 270a, 270b has a material engaging edge 278a, 278b and a pivot aperture 282a, 282b. The first portions 266a, 266b may be referred to as tab portions for purposes of this description and the claims, and the second portions 270a, 270b may be referred to as protruding portions for purposes of the description and the claims.

Figure 20A:
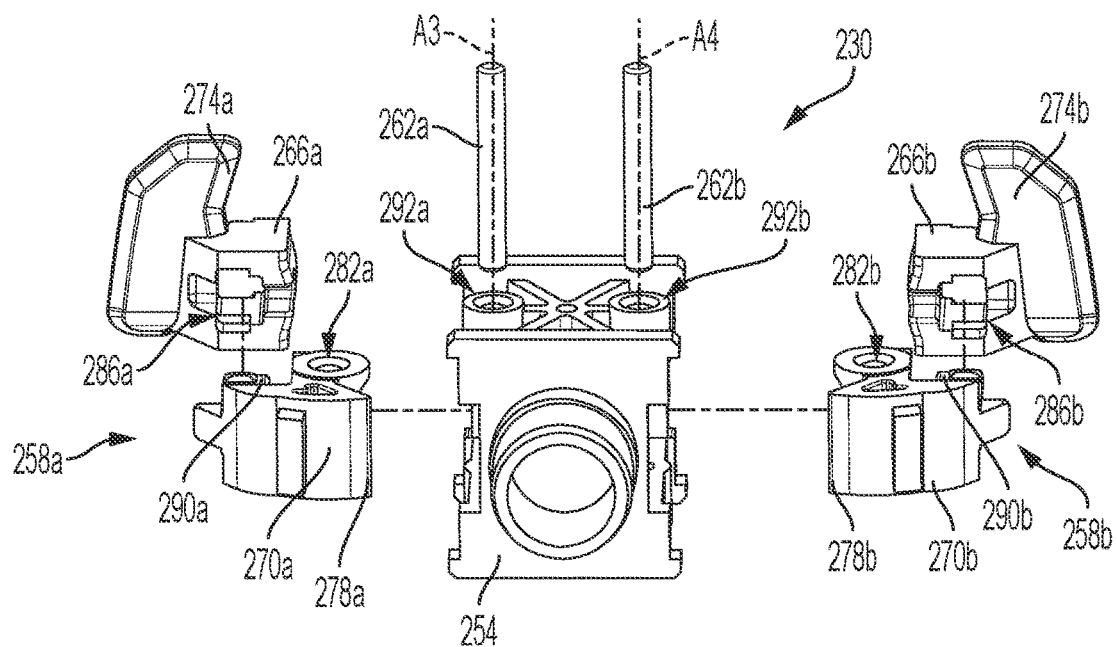
FIG. 20A is an exploded view of the feed mechanism.
Figure 20B:
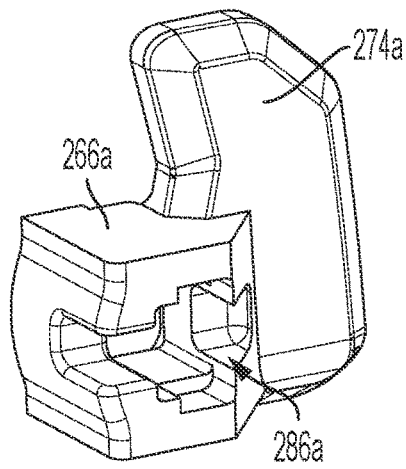
FIG. 20B is a perspective view of a portion of the feed mechanism.
Figure 20C:
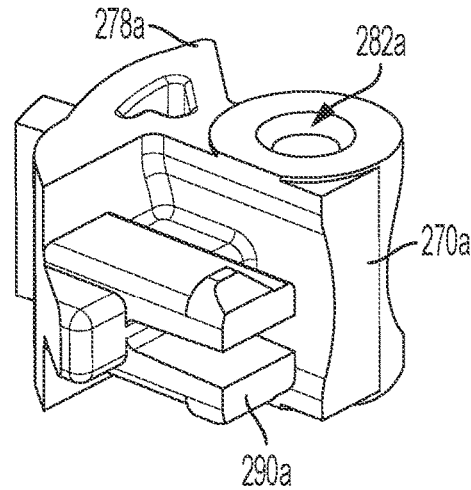
FIG. 20C is a perspective view of another portion of the feed mechanism.

Each of the first portions 266a, 266b is removably coupled to a corresponding second portion 270a, 270b. As shown in FIGS. 20A-20C, each of the first portions 266a, 266b includes a first mating component 286a, 286b, and each of the second portions 270a, 270b includes a second mating component 290a, 290b. In the illustrated embodiment, the first mating components 286a, 286b are female components, and the second mating components 290a, 290b are male components such that each of the first mating components 286a, 286b is engaged by or receive a corresponding second mating component 290a, 290b. In some embodiments, the first mating components 286a, 286b may be snap-fit to the second mating components 290a, 290b. In other embodiments, the first mating components 286a, 286b may dovetail with the second mating components 290a, 290b. In further embodiments, the first mating components 286a, 286b may be connected to the second mating components 290a, 290b by another connecting method. It will be appreciated that, while the disclosure describes and illustrates the first mating components 286a, 286b may be male components and the second mating components 290a, 290b may be corresponding female components. It will be further appreciated that the first portions 266a, 266b may be coupled to the respective second portions 270a, 270b in other ways without deviating from the scope of the disclosure.

Figure 23:
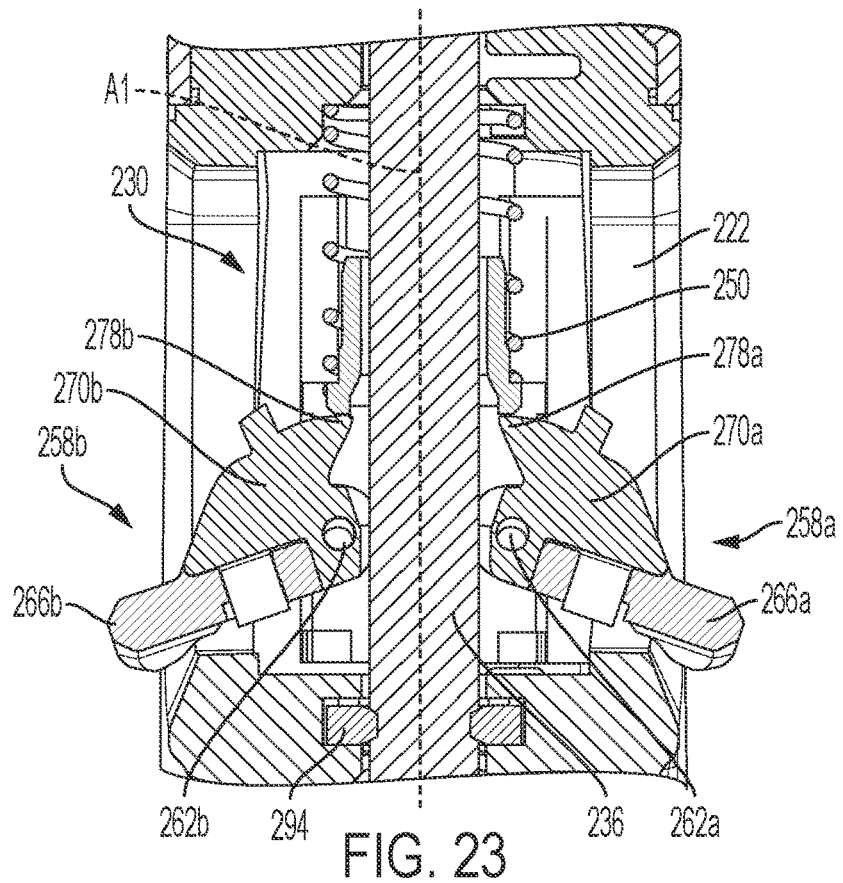
FIG. 23 is a section view of the glue pen in which actuators for the feed mechanism are in a first pivot position.
Figure 24:
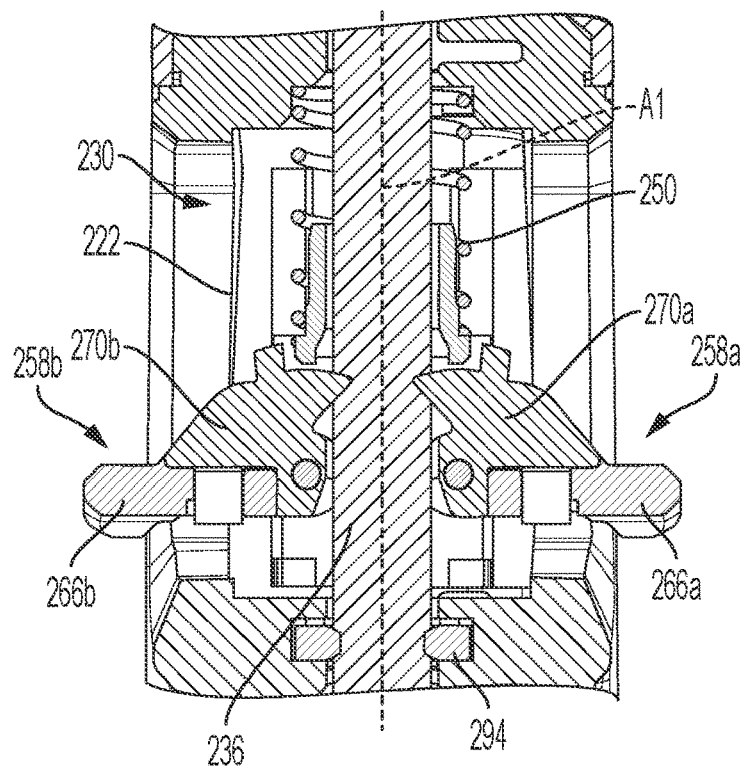
FIG. 24 is a section view of the glue pen in which actuators for the feed mechanism are in a second pivot position.

The pivot rods 262a, 262b extend through a corresponding hole 292a, 292b in the feed mechanism support 254. The pivot aperture 282a, 282b is configured to receive a corresponding one of the pivot rods 262a, 262b to pivotally couple the actuators 258a, 258b to the feed mechanism support 254. When the feed mechanism 230 is assembled, the first pivot rod 262a defines a first pivot axis A3, and the second pivot rod 262b defines a second pivot axis A3. The first actuator 258a is configured to pivot about the first pivot axis A3, and the second actuator 258b is configured to pivot about the second pivot axis A3, which is parallel to the first pivot axis A3. More specifically, when the first portions 266a, 266b are coupled to the second portions 270a, 270b, the tabs 274a, 274b of the first portions 266a, 266b may be pressed to rotate the first portions 266a, 266b and the second portions 270a, 270b about the first pivot axis A3 and the second pivot axis A4, respectively. As such, the actuator(s) 258a, 258b may be placed in a first pivot state (e.g., as illustrated in FIG. 23) in which the actuator(s) 258a, 258b is/are not engaged with the glue stick 236 and in a second pivot state (e.g., as illustrated in FIG. 24) in which the actuator(s) 258a, 258b engage the glue stick 236. In the illustrated embodiment, the first pivot axis A3 and the feed axis A1 are skew relative to each other, and the second pivot axis A4 and the feed axis A1 are skew relative to each other. That is, the first pivot axis A3 does not intersect the feed axis A1, and the second pivot axis A4 does not intersect the feed axis A1. As shown, the first pivot axis A3 extends perpendicular to the feed axis A1 on a first side of the plane P1 (e.g., parallel to the plane P1), and the second pivot axis A4 extends perpendicular to the feed axis A1 on a second side of the plane P1 (e.g., parallel to the plane P1).

Returning reference to FIG. 19, the glue pen 210 further includes a first sleeve 294 that is located adjacent the insertion opening 242 of the cavity 226 and a second sleeve 298 that is located adjacent the heater element end 246 of the cavity 226. The first sleeve 294 and the second sleeve 298 are disposed concentrically around the feed axis A1. The first sleeve 294 and the second sleeve 298 may have inner diameters that are equivalent to or slightly larger than the outer diameter of the glue stick 236 to allow movement of the glue stick 236 along the feed axis A1 and keep the glue stick 236 generally on the feed axis A1. As will be appreciated, in some embodiments, the first sleeve 294 and the second sleeve 298 may improve the accuracy and precision by which glue sticks 236 are directed through the glue pen 210.

Returning reference to FIG. 18, the battery unit 233 is received in the battery casing 232, and the battery casing 232 is received in the housing 222. The battery unit 233 is in electrical communication with the power button 238, the heater element 234, and the circuit board 237. Specifically, the power button 238 is pressable to turn the battery unit 233 on and off. When the battery unit 233 is turned on, the battery unit 233 is configured to output power to the heater element 234. A processor or controller on the circuit board 237 is configured to read, or sense, a charge status of the battery unit 233 and convey the charge status to a user via the indicator light 235.

Figure 21:
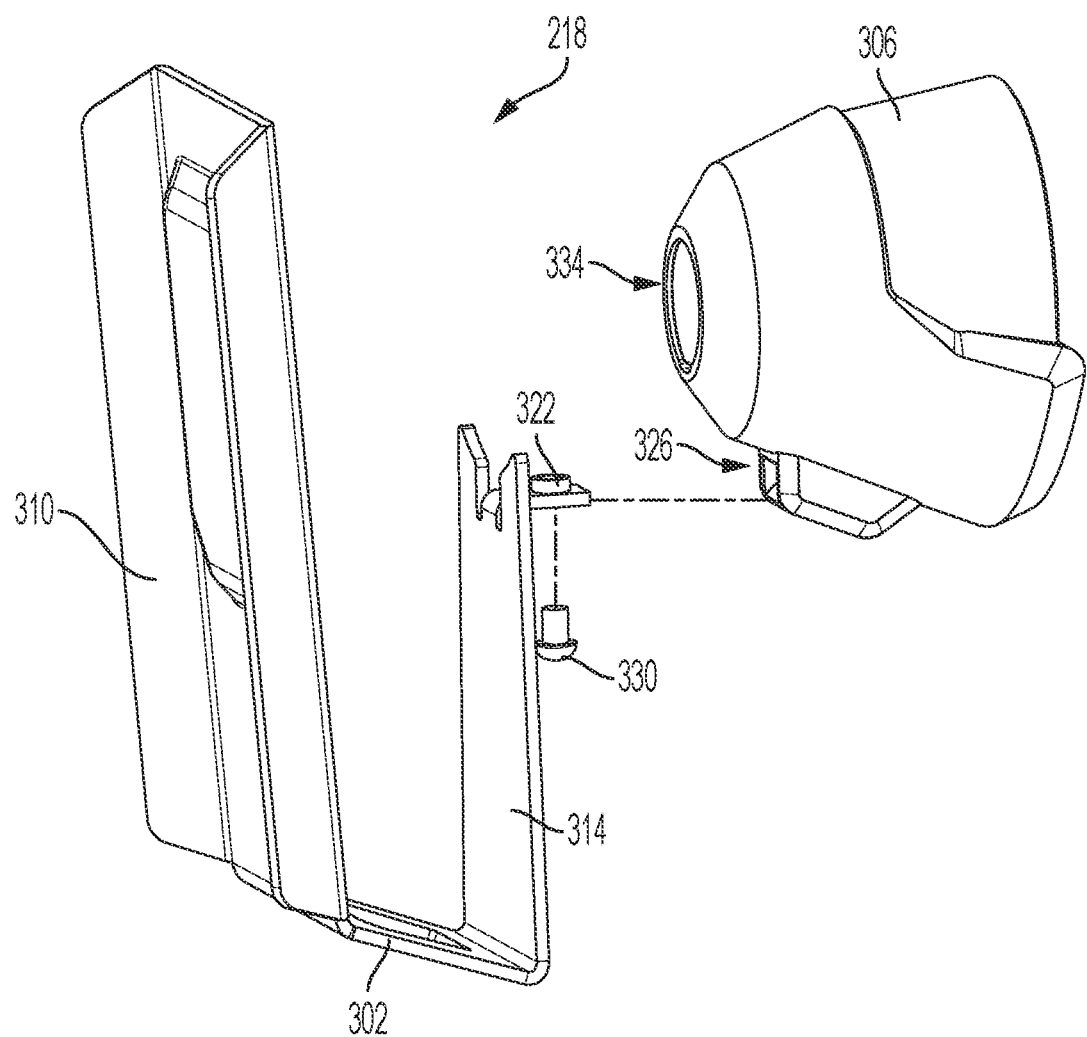
FIG. 21 is an exploded view of the glue pen stand.

FIG. 21 illustrates the stand 218 that includes a bracket 302 and a hollow support cone 306. The bracket 302 includes a base 310 that defines a drip tray 318 (e.g., as illustrated in FIG. 17) and a gun attachment extension 314. The attachment extension 314 extends from the base 310 and includes a tongue or projection 322. The support cone 306 defines a slot 326 that is engageable by the projection 322. A fastener 330 is insertable through the projection 322 and the slot 326 to secure or fix the support cone 306 to the bracket 302. The support cone 306 defines a central aperture 334 that overlaps the drip try 318 and that is engageable by the glue pen 214 such that the output end 240 of the glue pen 214 is suspended over the drip tray 318 (e.g., flush with or extends through the central aperture 334).

Figure 22:
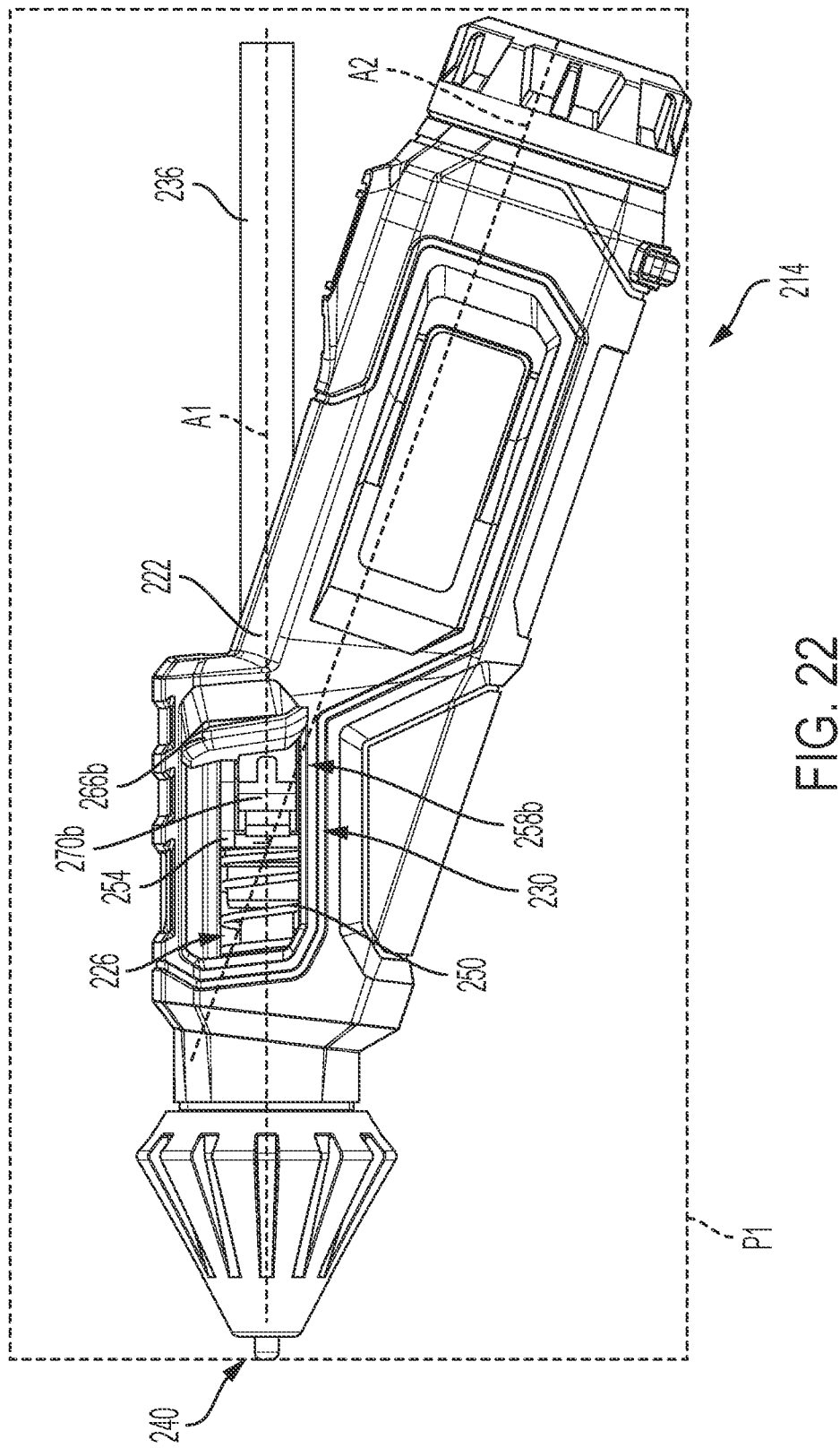
FIG. 22 is a side view of the glue pen with the feed mechanism in a start state.
Figure 25:
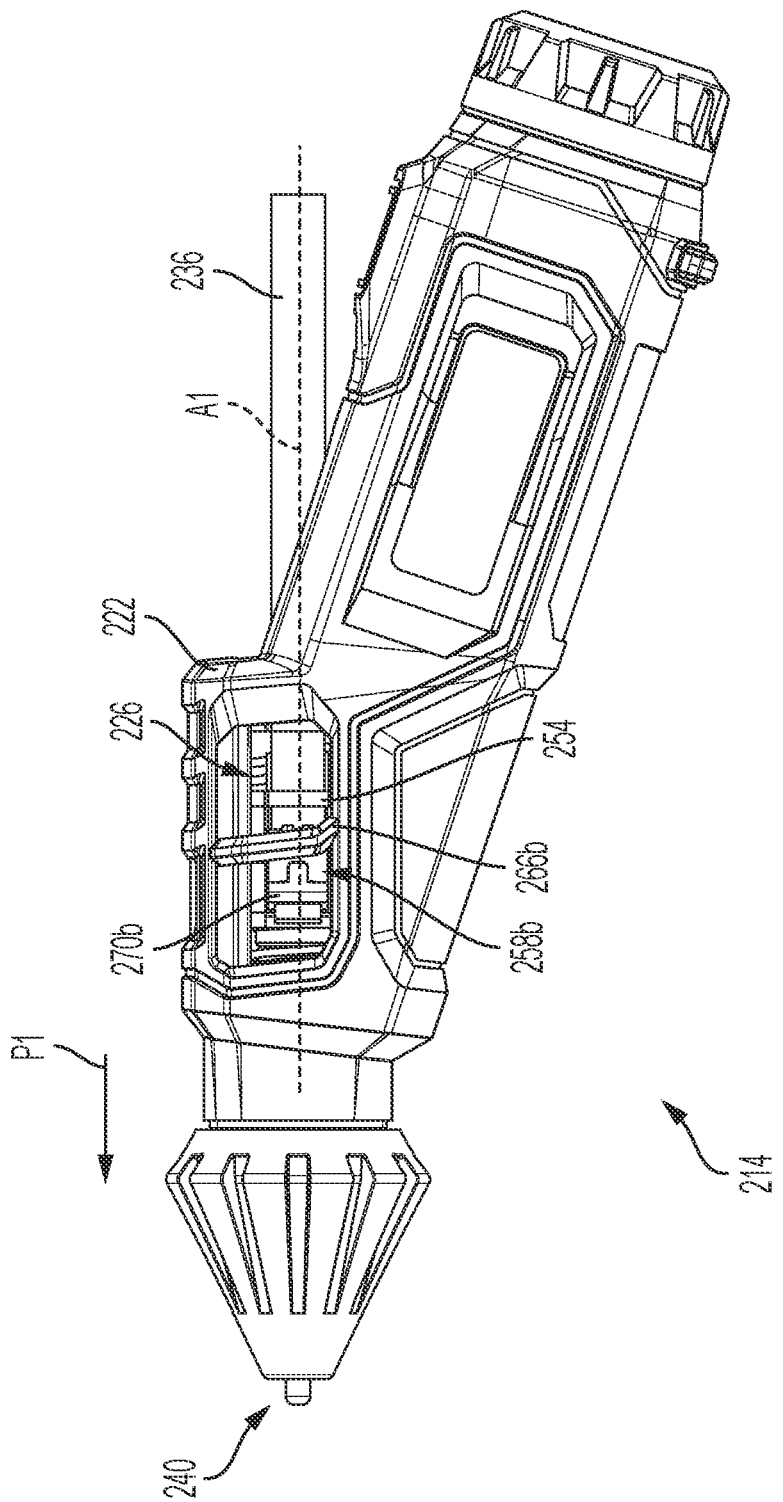
FIG. 25 is a side view of the glue pen in which the feed mechanism is in an end state.

To prepare the glue pen 214 for use, a user may first insert the glue stick 236 into the feed cavity 342 defined in the housing 222. When inserted, the glue stick 236 passes through the first sleeve 294, the insertion opening 242 of the cavity 226, the heater element end 246 of the cavity 226, and the second sleeve 298, and the glue stick 236 is positioned adjacent the heater element 234. A user may then depress the power button 238 to activate or turn on the glue pen 214. When the glue pen 214 is on, the battery unit 233 supplies power to the heater element 234. The heater element 234 may have a buffer time between the depression of the power button 238 and the heater element 234 reaching a maximum temperature. The glue stick 236 may be inserted into the feed cavity 342 before or after the glue pen 214 has been turned on and the heater element 234 has been effectively heated. heater element Operation of the glue pen 214 is described with regard to the glue pen 214 of FIGS. 17-25. It should be understood that the description of operation of the glue pen 214 may apply to operation of the glue pen 10 of FIGS. 1-16. FIGS. 22 and 23 illustrate the glue pen 214 with the glue stick 236 loaded in the glue pen 214 and with the actuators 258a, 258b in a start state or initial or first position. In the start state, the actuators 258a, 258b are positioned at a location adjacent to the insertion opening 242 of the cavity 226 and the actuators 258a, 258b, and more specifically, the material engaging edges 278a, 278b, are not engaged with the glue stick 236. With reference to FIGS. 23 and 24, each of the actuators 258a, 258b is actuatable by a user independent of the other actuator 258a, 258b to pivot the actuator 258a, 258b from the first pivot state (FIG. 23) to engage the glue stick 236 in the second pivot state (FIG. 24). After the actuator 258a, 258b is in the second pivot state, the actuator 258a, 258b may be engaged (e.g., pushed forward) to translate the glue stick 236 toward the heater element 234 along the feed axis A1. The actuators 258a, 258b may be simultaneously actuated to cooperatively engage the glue stick 236. Pressing one or both of the actuators 258a, 258b, and more specifically, the tabs 274a, 274b, in the direction of the heater element 234 rotates or pivots the actuated actuator(s) 258a, 258b about the first pivot axis A3 and/or the second pivot axis A4 (depending on which actuators 258a, 258b is/are actuated) such that the material engaging edge(s) 278a, 278b engage(s) the glue stick 236. With reference to FIG. 25, and after the material engaging edges 278a, 278b engage the glue stick 236, continued pressing on the actuator(s) 258a, 258b directs the glue stick 236 in the forward direction P1 (i.e. toward the heater element 234) to melt the forward end of the glue stick 236 when the heater element 234 is on. That is, continued pressing on the actuator(s) 258a, 258b by a user translates the actuator(s) 258a, 258b, and the engaged glue stick 236, forward relative to the housing 222. The heater element 234 heats the glue stick 236 and dispenses the melted substance from the glue pen 214. As is appreciated by those of ordinary skill in the art of glue pens and glue guns, the heater element 234 receives the glue stick 236 in a solid state and heats the glue as it travels along the heater element 234 before being dispensed in a melted, semi-viscous, state.

Rotation of the actuators 258a, 258b into engagement with the glue stick 236 and translation of the actuator(s) 258a, 258b forward relative to the housing 222 moves the actuator(s) 258a, 258b from the start state to an end state. In the end state, the actuator(s) 258a, 258b are engaged with a meltable adhesive substance (e.g., the glue stick 236) and one or both of the actuators 258a, 258b have been moved or translated toward the heater element 234. The end state may be any position between the position of the actuator(s) 258a, 258b in the start state and the heater element end 246 (i.e. each actuator 258a, 258b is infinitely positionable at a location forward of the start state relative to the cavity 226. After the actuator(s) 258a, 258b are placed in the end state and the desired amount glue has been dispensed from the output end 240, the user may release the actuator(s) 258a, 258b, which allows the actuator(s) 258a, 258b to return to the start state via bias from the spring 250 acting on the feed mechanism 230. The actuators 258a, 258b pivot out of engagement with the glue stick 236 (e.g., to the first pivot state) on or shortly after release of the tabs 274a, 274b. In some embodiments a spring or other bias member may act on the actuators 258a, 258b to pivot the actuators 258a, 258b from the second pivot state to the first pivot state after release of the tabs 274a, 274b.

As described above, some or all illustrated features may be omitted in a particular implementation within the scope of the present disclosure, and some illustrated features may not be required for implementation of all embodiments. The features described above may be implemented in an order different from the order described above and does not prohibit implementation in another order or combination. While not explained in detail for each embodiment and/or construction, the features of the disclosure described herein may be included on a tape dispenser independent of other features and are not limited to the illustrated disclosure. Embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A glue pen comprising:
a housing configured to support a meltable adhesive substance;
a heater element disposed in the housing; and
a feed mechanism coupled to the housing and including a first actuator and a second actuator, each of the first actuator and the second actuator selectively movable separately relative to the other actuator to move the meltable adhesive substance toward the heater element.

2. The glue pen of claim 1, wherein each of the first actuator and the second actuator is further selectively movable simultaneously with the other actuator to move the meltable substance toward the heater element.

3. The glue pen of claim 1, wherein the housing defines a passage and a feed axis that extends longitudinally through the passage and that defines a plane, wherein each of the first actuator and the second actuator are translatable to move the meltable adhesive substance along the first axis, and wherein the first actuator is positioned on a first side of the plane and the second actuator is positioned on a second side of the plane.

4. The glue pen of claim 3, wherein the housing includes a sleeve disposed in the housing and centered on the feed axis, wherein the sleeve is configured to guide the meltable adhesive substance along the feed axis.

5. The glue pen of claim 1, wherein the first actuator is selectively pivotable about a first axis to engage the meltable adhesive substance, wherein the second actuator is separately selectively pivotable about a second axis to engage the meltable adhesive substance.

6. The glue pen of claim 1, further comprising a spring disposed in the housing and engaged with the feed mechanism to bias the first actuator and the second actuator to a start state, wherein the first actuator and the second actuator are movable against the bias of the spring to an end state.

7. A glue pen comprising:
a housing including an output end and configured to support a meltable adhesive substance;
a heater element disposed in the housing adjacent or at the output end; and
a feed mechanism coupled to the housing and including an actuator pivotable about a first axis to engage the meltable adhesive substance, the actuator further movable from a start state to an end state to move the meltable adhesive substance toward the heater element, wherein the actuator is disengaged from the meltable adhesive substance in an unactuated state, and
wherein the actuator pivots into engagement with the meltable adhesive substance on engagement of the actuator by a user.

8. The glue pen of claim 7, further comprising a spring disposed in the housing and engaged with the feed mechanism to bias the actuator to a start state, wherein the actuator is movable against the bias of the spring to the end state.

9. The glue pen of claim 7, wherein the actuator includes a tab and a protruding portion, and wherein the tab is engageable to pivot the protruding portion into engagement with the meltable adhesive substance.

10. The glue pen of claim 9, wherein the tab is removably coupled to the protruding portion.

11. The glue pen of claim 7, wherein the housing defines a passage and a feed axis extending longitudinally through the passage, and wherein the actuator is translatable along the feed axis.

12. The glue pen of claim 11, wherein the actuator includes a first actuator and the end state is a first end state, wherein the feed mechanism further includes a second actuator that is pivotable about a second axis to engage the meltable adhesive substance, wherein the second actuator is translatable along the feed axis from the start state to a second end state to move the meltable adhesive substance toward the heater element.

13. The glue pen of claim 7, wherein the end state is defined by any position of the actuator that is forward of the start state.

14. The glue pen of claim 13, wherein the actuator is disengaged from the meltable adhesive substance on movement of the actuator to the start state.

15. A glue pen comprising:
a housing configured to support a meltable adhesive substance and defining a passage and a feed axis extending longitudinally through the passage, the housing including a grip portion oriented such that the feed axis extends along a plane that bisects the grip portion;
a heater element disposed in the housing;
a feed mechanism coupled to the housing and including an actuator protruding from a first lateral side of the housing away from the plane, the actuator engageable to move the meltable adhesive substance along the feed axis toward the heater element.

16. The glue pen of claim 15, wherein the actuator includes a first actuator extending from the first lateral side of the housing and the feed mechanism further includes a second actuator protruding from a second lateral side of the housing opposite the first side.

17. The glue pen of claim 15, wherein the grip portion extends along a grip axis that is oriented at a non-zero angle relative to the feed axis.

18. The glue pen of claim 17, wherein the grip portion defines a battery cavity and the glue pen further includes an end cap enclosing the battery cavity and removably coupled to a rear end of the grip portion.

19. The glue pen of claim 15, wherein the actuator includes a tab and a protruding portion selectively pivotable by the tab to engage the meltable adhesive substance, and wherein the tab is removably coupled to the protruding portion.

20. The glue pen of claim 15, wherein the actuator is pivotable to engage the meltable adhesive substance and translatable along the feed axis to move the meltable adhesive substance toward the heater element.

* * * * *